US010057540B2

(12) United States Patent
Krishnamoorthy et al.

(10) Patent No.: US 10,057,540 B2
(45) Date of Patent: *Aug. 21, 2018

(54) SEAMLESS CALL TRANSITIONS WITH PRE-ESCALATION PARTICIPATION CONFIRMATION

(71) Applicant: Microsoft Technology Licensing, LLC, Redmond, WA (US)

(72) Inventors: Sriraman Krishnamoorthy, Cupertino, CA (US); Heather Marie LeRoy, Saratoga, CA (US); Roy Marcus Grenaengen, Uppsala (SE); Johann Gerell, Stockholm (SE); Omobayonle Olatunji, Seattle, WA (US); Bo Erik Petter Wiberg, Uppsala (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,609

(22) Filed: Jun. 1, 2017

(65) Prior Publication Data
US 2017/0272695 A1 Sep. 21, 2017

Related U.S. Application Data

(63) Continuation of application No. 14/231,249, filed on Mar. 31, 2014, now Pat. No. 9,681,095, which is a
(Continued)

(51) Int. Cl.
*H04M 3/00* (2006.01)
*H04W 36/00* (2009.01)
(Continued)

(52) U.S. Cl.
CPC ......... *H04N 7/141* (2013.01); *H04L 61/1594* (2013.01); *H04L 65/1059* (2013.01);
(Continued)

(58) Field of Classification Search
CPC ......... H04M 3/436; H04M 3/42; H04W 4/16; H04W 4/06; H04W 36/0083; H04B 3/32; H04B 3/487
(Continued)

(56) References Cited

U.S. PATENT DOCUMENTS 5,596,628 A 1/1997 Klein
5,710,806 A 1/1998 Lee
(Continued)

FOREIGN PATENT DOCUMENTS

CN 1518290 8/2004
CN 101277343 10/2008
(Continued)

OTHER PUBLICATIONS

"FaceTime," Apple.com/ios/facetime/, visited Apr. 23, 2013, 3 pages.
(Continued)

*Primary Examiner* — Rasha Al Aubaidi
(74) *Attorney, Agent, or Firm* — Klarquist Sparkman, LLP

(57) ABSTRACT

The local address book of a device can be crawled for contact information, which is communicated to an address clearinghouse. The clearinghouse can indicate whether a contact is a participant in a video calling service. If so, an indication can be stored locally indicating that the contact is a participant. Later, during an audio-only call with the contact, an option to escalate the audio-only call to a video call via the video calling service can be presented.

20 Claims, 25 Drawing Sheets

Related U.S. Application Data continuation-in-part of application No. 14/201,547, filed on Mar. 7, 2014, which is a continuation of application No. 13/970,504, filed on Aug. 19, 2013.

(51) Int. Cl.

| | |
|---|---|
| *H04N 7/14* | (2006.01) |
| *H04L 29/06* | (2006.01) |
| *H04W 4/50* | (2018.01) |
| *H04L 29/12* | (2006.01) |
| *H04W 4/16* | (2009.01) |

(52) U.S. Cl.
CPC ...... *H04L 65/1069* (2013.01); *H04L 65/1089* (2013.01); *H04L 65/4015* (2013.01); *H04W 4/50* (2018.02); *H04W 4/16* (2013.01)

(58) Field of Classification Search
USPC .............................. 455/416, 436; 379/201.01
See application file for complete search history.

(56) References Cited

U.S. PATENT DOCUMENTS

| | | | |
|---|---|---|---|
| 5,894,512 | A | 4/1999 | Zenner |
| 6,975,622 | B2 | 12/2005 | Korycki et al. |
| 6,988,132 | B2 | 1/2006 | Horvitz |
| 7,653,715 | B2 | 1/2010 | Bobde et al. |
| 7,778,402 | B1 | 8/2010 | Corak et al. |
| 7,852,783 | B2 | 12/2010 | Tasker et al. |
| 8,041,020 | B2 | 10/2011 | Drewry et al. |
| 8,111,686 | B2 | 2/2012 | Chavda et al. |
| 8,223,189 | B2 | 7/2012 | Meyer et al. |
| 8,576,995 | B1 | 11/2013 | Marghescu et al. |
| 8,744,420 | B2 | 6/2014 | Cranfill |
| 8,942,674 | B2 | 1/2015 | Kumar et al. |
| 9,681,095 | B2 | 6/2017 | Krishnamoorthy et al. |
| 2005/0180338 | A1 | 8/2005 | Pirila et al. |
| 2007/0143397 | A1 | 6/2007 | Guedalia et al. |
| 2007/0263605 | A1 | 11/2007 | Estevez et al. |
| 2007/0273749 | A1 | 11/2007 | Fujii et al. |
| 2008/0056235 | A1 | 3/2008 | Albina et al. |
| 2008/0215591 | A1 | 9/2008 | Howard et al. |
| 2009/0028063 | A1 | 1/2009 | Chang |
| 2009/0070701 | A1 | 3/2009 | Dingle et al. |
| 2010/0080212 | A1 | 4/2010 | Krstulich |
| 2010/0083113 | A1 | 4/2010 | Weaver et al. |
| 2010/0199320 | A1 | 8/2010 | Ramanathan et al. |
| 2011/0164107 | A1 | 7/2011 | Tian et al. |
| 2011/0194678 | A1 | 8/2011 | Lewis et al. |
| 2011/0207447 | A1 | 8/2011 | Bhow |
| 2011/0249073 | A1 | 10/2011 | Cranfill et al. |
| 2011/0249079 | A1 | 10/2011 | Santamaria et al. |
| 2011/0275358 | A1 | 10/2011 | Faenger |
| 2011/0273526 | A1 | 11/2011 | Mehin et al. |
| 2011/0306325 | A1 | 12/2011 | Gutta et al. |
| 2012/0062688 | A1 | 3/2012 | Shen et al. |
| 2012/0066596 | A1 | 3/2012 | Feng et al. |
| 2012/0225652 | A1 | 9/2012 | Martinez et al. |
| 2012/0243530 | A1 | 9/2012 | Rosenberg et al. |
| 2013/0111365 | A1 | 5/2013 | Chen et al. |
| 2013/0170361 | A1 | 7/2013 | Manyakin et al. |
| 2013/0238729 | A1 | 9/2013 | Holzman et al. |
| 2013/0293664 | A1 | 11/2013 | Tsang et al. |
| 2013/0335519 | A1 | 12/2013 | Greenslade et al. |
| 2014/0003597 | A1 | 1/2014 | Lazaridis et al. |
| 2014/0254785 | A1 | 9/2014 | Ezell et al. |
| 2014/0302830 | A1 | 10/2014 | Yang |
| 2015/0022901 | A1 | 1/2015 | Patel et al. |
| 2015/0049157 | A1 | 2/2015 | Krishnamoorthy et al. |
| 2015/0049158 | A1 | 2/2015 | Olatunji et al. |
| 2015/0049160 | A1 | 2/2015 | Krishnamoorthy et al. |
| 2015/0049164 | A1 | 2/2015 | Krishnamoorthy et al. |
| 2015/0049867 | A1 | 2/2015 | Jafry et al. |
| 2015/0078538 | A1 | 3/2015 | Jain |

FOREIGN PATENT DOCUMENTS

| | | |
|---|---|---|
| CN | 101729555 | 6/2010 |
| CN | 102257791 | 11/2011 |
| EP | 0583094 | 2/1994 |
| EP | 1439681 | 7/2004 |
| EP | 2120440 | 11/2009 |
| EP | 2493166 | 8/2012 |
| EP | 2611255 | 7/2013 |
| EP | 2625848 | 8/2013 |
| WO | WO 2006/052176 | 5/2006 |
| WO | WO 2006/121272 | 11/2006 |
| WO | WO 2006/137646 | 12/2006 |
| WO | WO 2009/081334 | 7/2009 |
| WO | WO 2012/047901 | 4/2012 |

OTHER PUBLICATIONS

"FaceTime," Wikipedia, visited Jul. 29, 2013, 5 pages.
Frost, Laurence. "Nokia Motorola show cellular VoIP phones," USAToday.com, visited Apr. 23, 2013, 2 pages.
"Generic Access Network," Wikipedia, visited Apr. 24, 2013, 7 pages.
"Mobile Operators plan to make Instant Messaging, Live Video Sharing, and File Transfer as easy on the mobile as calling and text," wirelessfederation.com/news/, visited Jul. 29, 2013, 5 pages.
"Nokia 6301 hits on UMA," gsmarena.com, visited Apr. 23, 2013, 2 pages.
"Rich Communication Services," Wikipedia, visited Jul. 29, 2013, 6 pages.
"Tango (application)," Wikipedia, visited Jul. 15, 2013, 3 pages.
Unuth, Nadeem. "UMA Explained: What is UMA?" About.com, visited Apr. 23, 2013, 1 page.
"Viber," Wikipedia, visited Jul. 15, 2013, 3 pages.
"Vtok-Free Calls, Texts, Chat, Video for Google Talk and Voice," Jun. 24, 2013, available at https://itunes.apple.com/in/app/vtok-free-calls-texts-chat/id421102042?mt=8, 3 pages.
"Bria-VoIP SIP Pone with Video and Messaging," Jul. 12, 2013, available at: https://itunes.apple.com/us/app/bria-voip-sip-phone-video/id373968636?mt=8, 2 pages.
"Cisco Jabber Video," Feb. 11, 2012, available at: http://www.ivci.com/cisco-jabber-video-for-telepresence.html#page=page-1, 2 pages.
Piltch, "How to Change Default Apps in Android," Mar. 12, 2013, available at: http://blog.laptopmag.com/how-to-change-default-apps-in-android, 8 pages.
Barnard, "VoIP Phone System Maker ShoreTel Releases ShoreTel 7, Adds New Switches and Conference Phone," http://technews.tmcnet.com/hosted-voip/feature/articles/6390-voip-phone-system-maker-shoretel-releases-shoretel7.htm, Apr. 23, 2007, 3 pages.
"Google Talk Call Signaling," https://developers.google.com/talk/call_signaling#Detecting_support_and_call_routing, Nov. 1, 2012, 10 pages.
"Lync Product Guide," http://download.microsoft.com/download/1/2/2/1223C7C-A549-4663-A339-D55379B658A1/Lync%20Product%20Guide.pdf, Nov. 2012, 30 pages.
Baset et al., "An Analysis of the Skype Peer-to-Peer Internet Telephony Protocol," in Technical Report CUCS-039-04, Sep. 15, 2004, 12 pages.
"Voice and Video Calling over LTE," http://www.ericsson.com/res/docs/whitepapers/WP-Voice_video_calling_:TE.pdf, Feb. 2102, 18 pages.
"Call Escalation from Voice to Video," http://www.cisco.com/en/US?docs/ios-xml/ios/voice/cube sipsip/configuration/ex-3s/voi_callesc_voice2vid.pdf, retrieved Aug. 16, 2013, 4 pages.
"LG Paving the Way with Mobile Technologies," http://www.lg.com/in/innovation/technology/lg-lte-tech, retrieved Aug. 16, 2013, 2 pages.
Blandford, "Viber for Windows Phone 8 updated with VoIP support," http://allaboutwindowsphone.com/flow/ite/17188_Viber_for_Windows_Phone_8_upda.php, Apr. 2, 2013, 10 pages.

(56) References Cited

OTHER PUBLICATIONS

Telephone Systems—From PSTN to VOIP, http://www.numberstore.com/Telephone-Systems-From-PSTN-to-VOIP.html, Dec. 3, 2011, 2 pages.
Mombrea, "Use your cell phone as a WiFi VOIP phone," http://www.itworld.com/consumerization-it/372436/use-your-cell-phone-wifi-voip-phone, Sep. 11, 2013, 5 pages.
Skype Gateways, http://www.voip-info.org/wiki/view/Skype+Gateways, Oct. 11, 2006, 10 pages.
Donnell, "LG Demonstrates Seamless Voice-To-Video Call Switching at MWC," http://www.talkandroid.com/95307-lg-demonstrates-seamless-voice-to-video-call-switching-at-mwc/, Feb. 28, 2012, 10 pages.
International Search Report and Written Opinion issued in PCT Application No. PCT/US2014/051391, dated Dec. 17, 2014, 10 pages.
International Search Report and Written Opinion issued in PCT Application No. PCT/US2014/051393, dated Dec. 17, 2014, 10 pages.
Henry et al., "Rich Communication Suite," Intelligence in Next Generation Networks, 2009, ICIN 2009, 13th International Conference on, IEEE, Piscataway, NJ, Oct. 26, 2009, pp. 1-6.
International Search Report and Written Opinion issued in PCT Application No. PCT/US2014/051392, dated Dec. 17, 2014, 13 pages.
International Search Report and Written Opinion issued in PCT Application No. PCT/US2014/051394, dated Dec. 17, 2014, 10 pages.
3rd Generation Partnership Project; Technical Specification Group Services and System Aspects; IP Multimedia Subsystem (IMS) centralized services; Stage 2 (Release 12), 3GPP TS23.292, V12.2.1, Jun. 2013, 120 pages.
Second Written Opinion issued in PCT Patent Application No. PCT/US2014/051394, corresponding to U.S. Appl. No. 13/970,504, dated Jun. 29, 2015, 6 pages.
Second Written Opinion issued in PCT Application No. PCT/US2014/051392, corresponding to U.S. Appl. No. 14/231,208, dated Aug. 7, 2015, 6 pages.
Second Written Opinion issued in PCT Application No. PCT/US2014/051393, corresponding to U.S. Appl. No. 14/231,249, dated Aug. 10, 2015, 6 pages.
Second Written Opinion issued in PCT Application No. PCT/US2014/051391, corresponding to U.S. Appl. No. 14/231,167, dated Aug. 10, 2015, 6 pages.
3rd Generation Partnership Project; Technical Specification Group Services and System Aspects; IP Multimedia Subsystem (IMS) Service Continuity; Stage 2 (Release 12) 3GPP Standard: TS23.228, Stage 2(3 GPP TS 23.228 version 1.9.0 Release 12) retrieved on: Mar. 5, 2013, pp. 1-290.
3rd Generation Partnership Project; Technical Specification Group Services and System Aspects; IP Multimedia Subsystem (IMS) Service Continuity; Stage 2 (Release 11), 3GPP TS 23.237, version 11.5.0, Published on: Jun. 2012, pp. 1-169.
International Preliminary Report on Patentability, issued in PCT Application No. PCT/US2014/051394, corresponding to U.S. Appl. No. 13/970,504, dated Oct. 2, 2015, 7 pages.
International Preliminary Report on Patentability, issued in PCT Application No. PCT/US2014/051393, corresponding to U.S. Appl. No. 14/231,249, dated Nov. 3, 2015, 7 pages.
International Preliminary Report on Patentability, issued in PCT/US2014/051392, corresponding to U.S. Appl. No. 14/231,208, dated Nov. 3, 2015, 7 pages.
International Preliminary Report on Patentability, issued in PCT Application No. PCT/US2014/051391, corresponding to U.S. Appl. No. 14/231,167, dated Oct. 29, 2015, 7 pages.
Trautschold et al., iPhone 4 Made Simple, Chapter 12, "FaceTime Video Messaging and Skype," Apress, Springer Science+Business Media, 2010, 27 pages.
Examination Report received in related Australian Application No. 2014309155, dated Oct. 11, 2017, 3 pages.
First Office Action and Search Report received in a counterpart Chinese Patent Application No. 20148004237.1, with partial English translation, dated Jun. 5, 2018, 13 pages.
First Office Action and Search Report received in a counterpart Chinese Patent Application No. 201480046051.6, with partial English translation, dated May 31, 2018, 12 pages.

| REGISTERED VIDEO APPS ||
| APP | PREFERRED |
| APPLICATION 1 | |
| APPLICATION 2 | |
| APPLICATION 3 | Y |

830 — table
830A — APP column
830B — PREFERRED column

SEAMLESS CALL TRANSITIONS WITH PRE-ESCALATION PARTICIPATION CONFIRMATION

CROSS REFERENCE TO RELATED APPLICATIONS

This application is a continuation of U.S. patent application Ser. No. 14/231,249, filed Mar. 31, 2014, which is a continuation-in-part (CIP) of U.S. patent application Ser. No. 14/201,547, filed on Mar. 7, 2014, which is a continuation of U.S. patent application Ser. No. 13/970,504, filed on Aug. 19, 2013, all of which are hereby incorporated by reference herein.

BACKGROUND

Mobile phones now have functionality and applications that provide a wide variety of communication modes. For example, a single device can now support conventional phone calls, Voice-over-Internet-Protocol (VoIP) calls, video calls, and the like. However, such functionality has not been particularly well integrated, and various user experience aspects are less than desirable.

For example, although many devices support video calls, the dominant form of communication remains audio-only calls. Although the technology for video calls has matured, the user experience remains less than optimal. For example, while engaged in an audio-only call, a user may not be presented with a simple way of benefiting from the video call technology that is available, or unexpected behavior may result when attempting to use video call technology.

Because users can face hurdles when attempting to take advantage of different communication modes, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as a method comprising, for a plurality of contacts stored at the communication device, reading contact information for the contacts; communicating the contact information to an address clearinghouse; receiving participation confirmation for a participating contact out of the contacts; locally storing an indication that the participating contact is a participant in a video calling service; and subsequently, during an audio-only call with the participating contact, responsive to the stored indication, presenting an option to escalate the audio-only call to a video call via the video calling service.

An embodiment can be implemented as a system comprising an endpoint device comprising a video calling application, a transition engine, and a plurality of stored contacts, wherein the endpoint device is in communication with an address book clearinghouse, wherein the address book clearinghouse stores a plurality of identifiers for users of a video calling service; wherein the endpoint device is configured to periodically communicate information about a particular contact out of the plurality of stored contacts to the address book clearinghouse and receive in response a confirmation that the particular contact is a participant in the video calling service; and wherein the endpoint device is configured to bypass a confirmation user interface for the particular contact during call escalation of an audio-only call to a video call via the video calling service.

An embodiment can be implemented as one or more computer-readable media comprising computer-executable instructions causing a communications device to perform a method comprising determining that the communications device is idle; for a plurality of contacts stored at the communication device, reading contact information for the plurality of contacts; communicating the contact information to an address clearinghouse; via the address clearinghouse, receiving participation confirmation for a participating contact; locally storing an indication that the participating contact is a participant in a video calling service; subsequently, during an audio-only call with the participating contact, presenting an option to add video to an audio-only call via the video calling service; and bypassing a confirmation user interface for the participating contact.

As described herein, a variety of other features and advantages can be incorporated into the technologies as desired.

BRIEF DESCRIPTION OF THE DRAWINGS

FIG. 8 is a block diagram of a table storing a preferred communication application.

DETAILED DESCRIPTION

Example 1—Exemplary Overview

Figure 1:
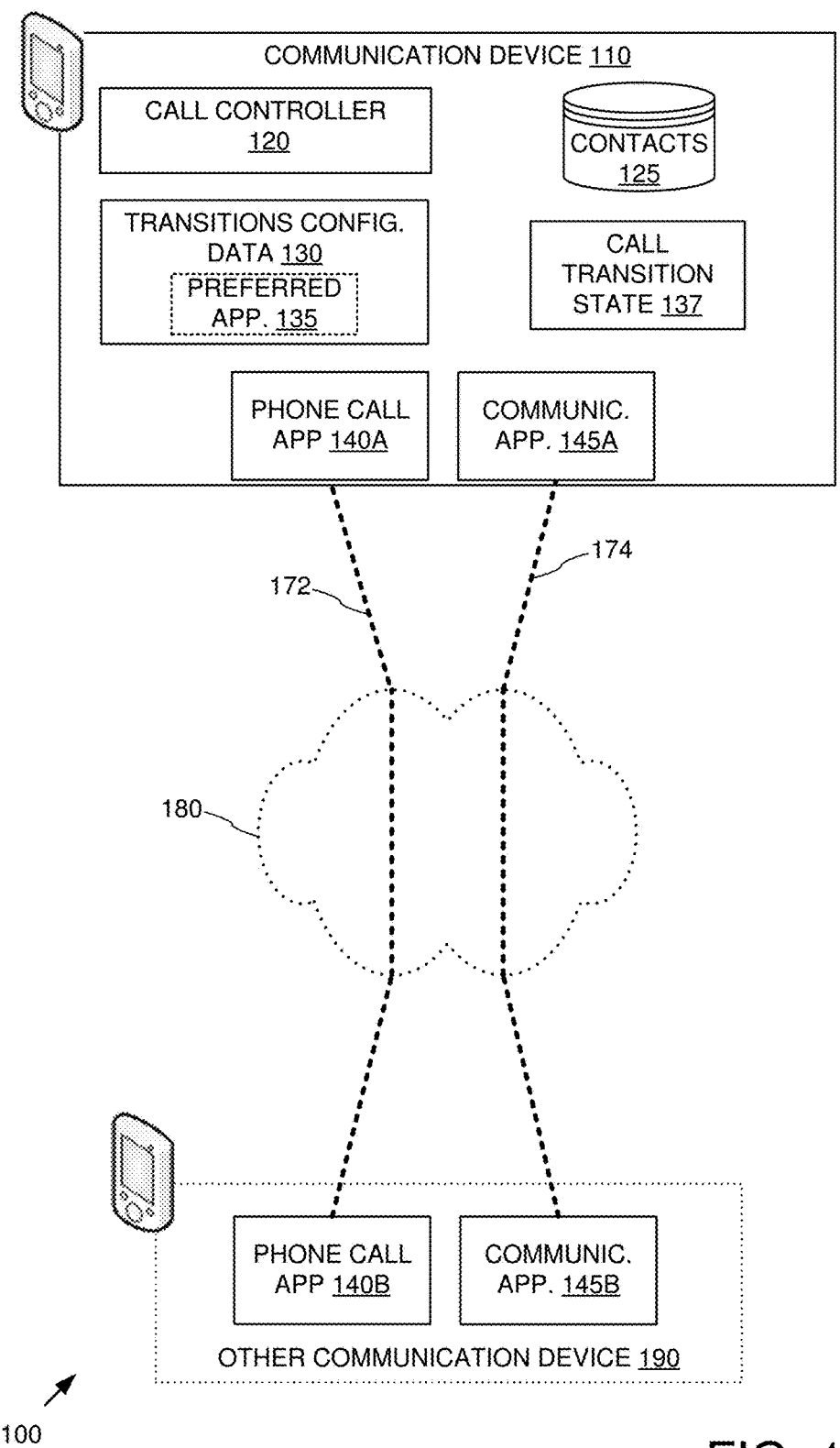
FIG. 1 is a block diagram of an exemplary system implementing seamless call transitions.

The technologies described herein can be used for a variety of seamless call transition scenarios, and adoption of the technologies can provide improved techniques for communicating via different call types. The user interfaces can better facilitate seamless call transitions. Other features described herein can be implemented to customize the call experience to user preferences. An overall superior user experience with smoother transitions between call types can result.

In the case of an escalation of an audio-only call to a video call, the recipient user (i.e., invited party) may be online at a plurality of endpoint devices. As described herein, in some embodiments, the invitation can be displayed at only the endpoint device involved in the audio-only call.

Such an arrangement can be helpful in preserving privacy in case one of the endpoint devices is at a different location. For example, if a user happens to be online at a home endpoint device, and a call is taking place outside the home, the invitation will not be displayed at the home endpoint device. Such an arrangement can also avoid inadvertent pick up of the video call at a different (e.g., the incorrect) location.

While a device is engaged in an audio-only call, an incoming video call can be received. In some embodiments, video call context information can be included as part of the incoming video call notification, and such information can include an indication that the incoming video call is in fact an escalation of the audio-only call. Based on the call context information, a variety of actions can be taken. For example, the audio-only call can be seamlessly transitioned to the video call.

Such an arrangement allows more intelligent processing of incoming video calls. For example, an ordinary incoming video call can be differentiated from a video call that is an escalation of a current audio-only call.

In some embodiments, the local address book of a device can be crawled for contact information, which is communicated to an address clearinghouse. The clearinghouse can indicate whether a contact can participate in a video calling service. If so, an indication can be stored locally indicating that the contact can participate. Later, during an audio-only call with the contact, an option to escalate the audio-only call to a video call via the video calling service can be presented.

Such an arrangement allows pre-escalation confirmation of participation of a user in a video calling service. The subsequent opportunity to escalate an audio-only call can take place without displaying confirmation user interface, which can be bypassed as described herein. Also, obtaining such information in advance can result in a smoother call transition and/or determination of whether transition is possible.

As described herein, the technologies can support call escalation of a public switched telephone network (PSTN) audio-only call to a video call supported by a video calling service that uses a non-PSTN network to provide video call functionality.

Further, the technologies can support a variety of communication applications and implement cross-platform seamless call transitions.

Various other features can be implemented and combined as described herein.

Example 2—Exemplary System Implementing Seamless Call Transitions

FIG. 1 is a block diagram of an exemplary system 100 implementing seamless call transitions as described herein.

For purposes of context, FIG. 1 shows that the communication device 110 is engaged in communication with another (e.g., remote) communication device 190 via one or more networks 180.

In the example, a communication device 110 includes a call controller 120 and a contact database 125. Transitions configuration data 130 can include a preferred application for use with a particular call type. A call transition state 137 can track the state of call transition as described herein.

The communication device 110 can support two simultaneous calls 172, 174 of different call types with another communication device 190. As shown, the calls can be hosted by two different applications, a phone call application 140A in communication with its counterpart 140B and another (e.g., non-phone call) communication application 145A in communication with its counterpart 145B. The different applications 140A, 145B can be of different application types. As described herein, cross-platform operation can be supported. The calls can pass through one or more networks 180. For example, the calls 172, 174 can be made over the same or different networks 180. The calls can pass through different physical or logical communication channels.

As described herein, a transition between the two calls 172, 174 can be performed seamlessly to give the impression that a single call is involved (e.g., the call or communication are not interrupted). Various techniques, such as initiating the second call in the background, maintaining the first call, suppressing audio of the second call, inhibiting portraying the second call as a second call, and ultimately transitioning to the second call can be applied to implement seamless call transitions.

Although various components are shown in separate boxes, in practice, component boundaries may vary. For example, the components can be provided as part of a phone operating system, call controller, or the like. Other arrangements are possible while still implementing the technologies.

In practice, the systems shown herein, such as system 100, can be more complicated, with additional functionality, more communication apps, and the like.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, preferences, and applications can be stored in one or more computer-readable storage media or computer-readable storage devices. The technologies described herein can be generic to the specifics of operating systems or hardware and can be applied in any variety of environments to take advantage of the described features.

Example 3—Exemplary Method Implementing Seamless Call Transitions

Figure 2:
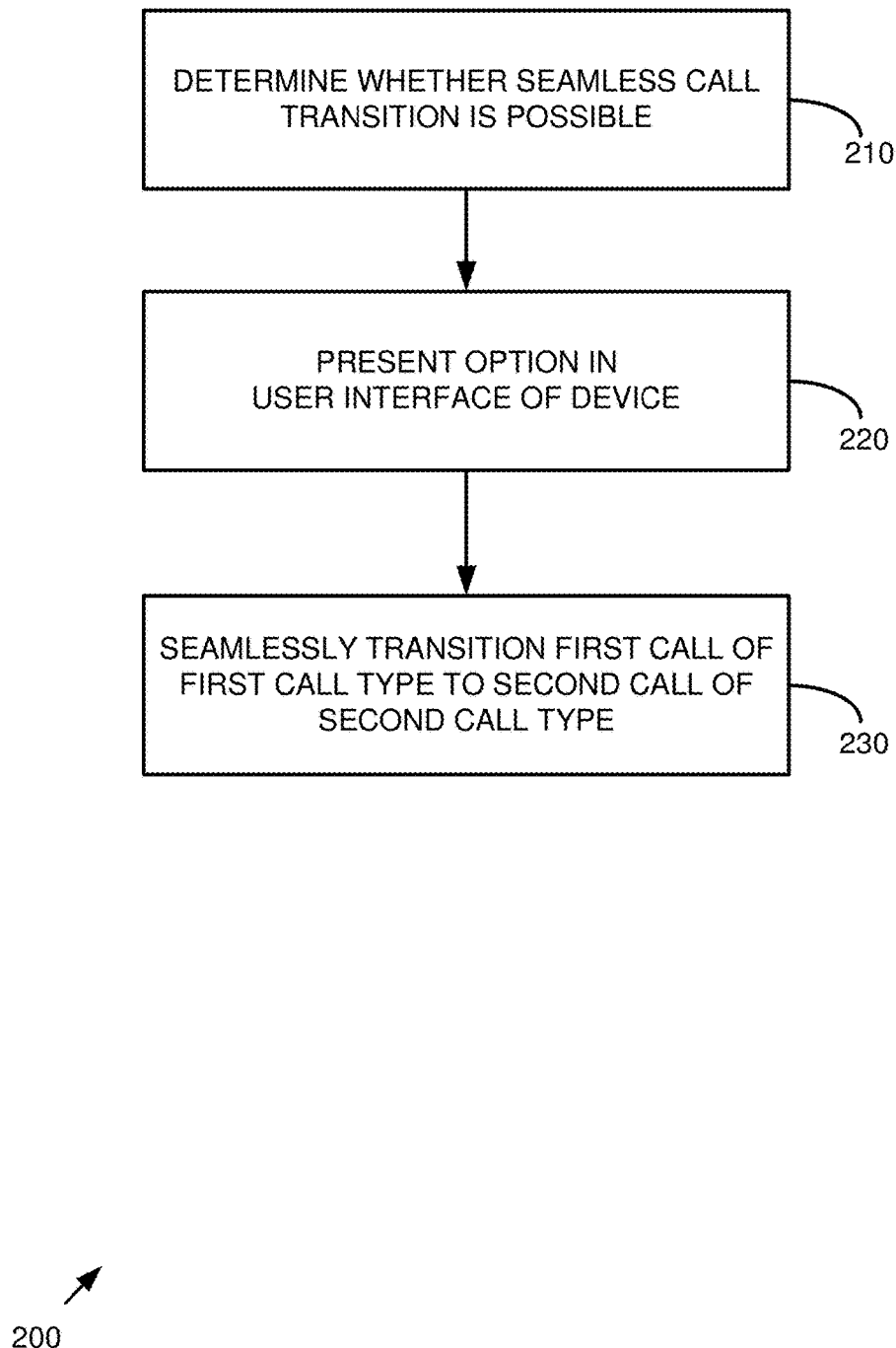
FIG. 2 is a flowchart of an exemplary method of implementing seamless call transitions.

FIG. 2 is a flowchart of an exemplary method 200 of implementing seamless call transitions and can be implemented, for example, in the system shown in FIG. 1.

The method 200 is typically performed after a first call (e.g., with a phone call application) has already been established. In practice, a call progress user interface is displayed while conducting the first call.

At 210, it is determined whether seamless call transition to a second call of a second call type (e.g., different from the first call) is possible. Such a determination can be made while conducting the first call of the first call type. As described herein, such a determination can be based on capabilities of the other communication device, network conditions, and the like. At this point, the second call need not be established.

At 220, responsive to determining that seamless call transition is possible, an option is presented in a user interface of the communication device to initiate seamless call transition. As described herein, such an option can take the form of a graphical button that is enabled upon determination that seamless call transition is possible. The option can be presented as part of a call progress user interface (e.g., while conducting the first call).

Although not shown, the method can include obtaining consent from the other communication device as described herein.

At 230, responsive to activation of the user interface option, the first call of the first call type is seamlessly transitioned to a second call of the second call type. The second call can be established (e.g., as part of the transition process or beforehand) while maintaining the first call. Thus, to a user of the communication device, the two calls appear to be as one (e.g., uninterrupted) call. A typical scenario is transitioning a phone call to a VoIP call (e.g., with or without video), but other transitions are possible as described herein.

During seamless transitioning, two calls can be simultaneously maintained with the same (e.g., other) communication device.

A variety of techniques can be used during seamless transitioning. For example, the second call can be initiated, the audio suppressed, and connectivity confirmed. Subsequently, the audio can be unsuppressed, and the first call can be dropped.

Upon transition to the second call, any features available to a call of the second type can be made available. As described herein, such features can include video, screen sharing, or other functionality provided by the communication application orchestrating the second call. Accordingly, the user interface can be upgraded to provide or indicate such features.

A typical use case for the method 200 is to transition a call from a phone call over a conventional (e.g., circuit switched, cellular, or the like) phone call to a Voice-over-Internet-Protocol (VoIP) call. VoIP calls can support video and other features as desired. However, the technologies can support transitions between other call types, or transitions in the other direction.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Exemplary Communication Device Implementing Seamless Call Transitions

Figure 3:
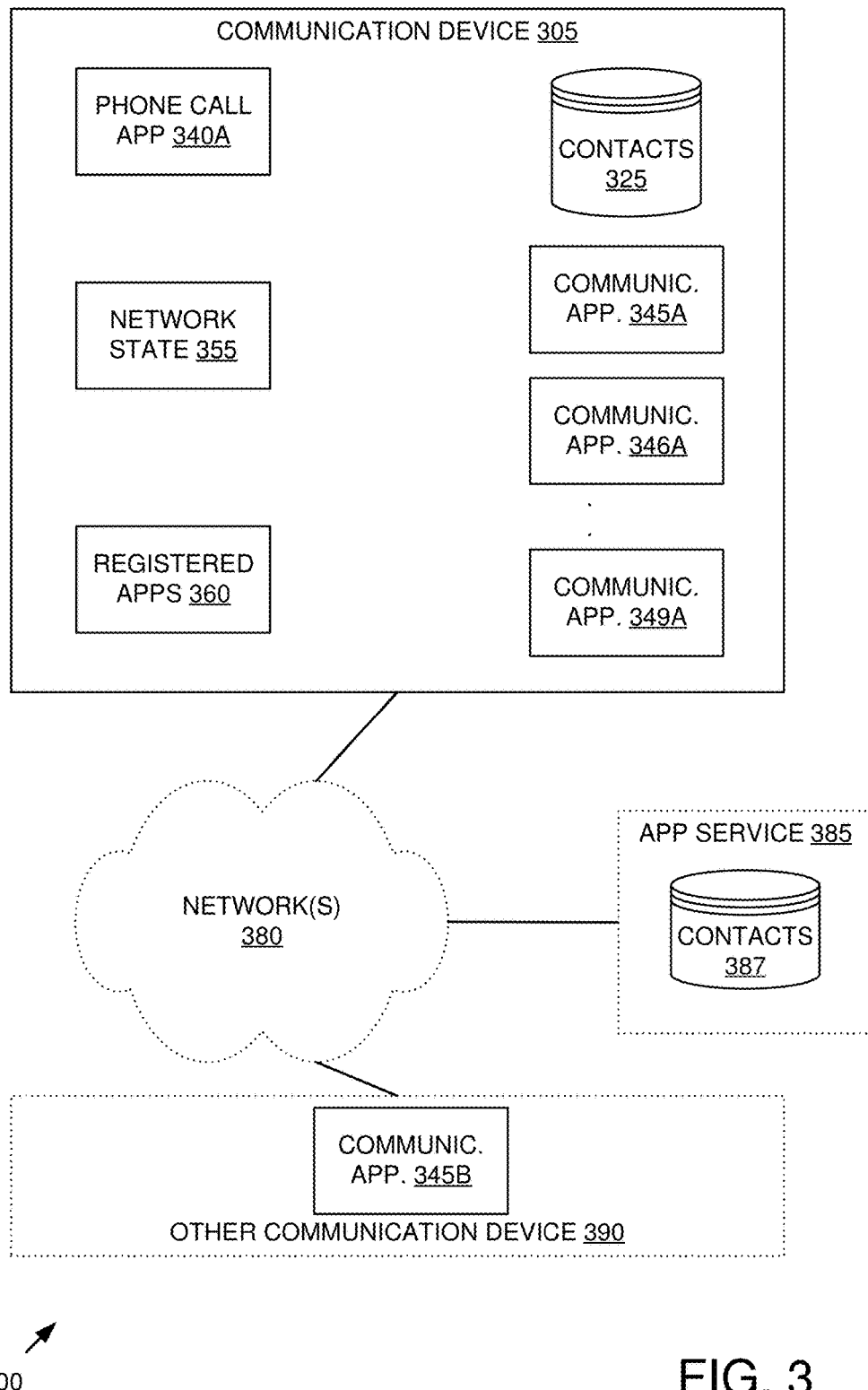
FIG. 3 is a block diagram of an exemplary system configured to determine whether seamless call transitions are possible.

FIG. 3 is a block diagram showing an exemplary system 300 configured to determine whether seamless call transitions are possible. In the example, a communication device 305 (e.g., communication device 110 of FIG. 1) comprises a phone call app 340A, one or more communication applications 345A-349A, a contacts data base 325, and network state indicator 355.

A variety of techniques can be used to determine whether a seamless call transition is possible. In some cases, a variety of different call types may be supported, and the determination can be made individually for the different call types (e.g., a seamless transition to a video call may not be possible, but a seamless transition to VoIP without video may be possible).

As described herein, a determination of whether a seamless call transition to a particular call type is possible can depend on the network state indicator 355, which indicates whether conditions on the network 380 will support the call type. A check against the application registration information 360 can also be performed to determine whether an application that supports seamless transitions is registered. Different apps can be registered for different call types as described herein. The information 360 can indicate whether a particular application supports seamless transitions (e.g., by call type).

The determination can also depend on the capabilities of the other communication device 390. One technique for determining the capabilities of the other communication device 390 is to store information locally (e.g., associated with the contacts database 325). For example, if a device is known to have video capabilities, an entry in the database (e.g., based on phone number or other address) can be annotated to indicate that the device has video capabilities. The communication device 305 can periodically update the local store by communicating with the application service 385 (e.g., to determine if contacts in the contacts database 387 match those in the local database 325).

However, a user may have multiple devices that use the same address or username for a particular communication service. Accordingly, capabilities can be determined by communicating with a counterpart communication application 345B on the other communication device 390. Or, an application service 385 may actively update the status of tracked devices (e.g., whether they are connected, what version of software they have, etc.).

In some cases, no communication applications 345A-349A are present. Or, no communication applications of a particular type may be present. In such a case, although a seamless call transition is not immediately possible, an option in the current user interface can be presented by which an appropriate communication application can be obtained as described herein. Consequently, seamless transition may then be possible. Thus, users can be helpfully informed that transition functionality is a possibility on their device.

Similarly, if an application is present but not configured or activated, an option in the current user interface can be presented by which the communication application can be configured or activated. Again, users can be helpfully informed that transition functionality is a possibility on their device.

Example 5—Exemplary Method Implementing Seamless Call Transitions

Figure 4:
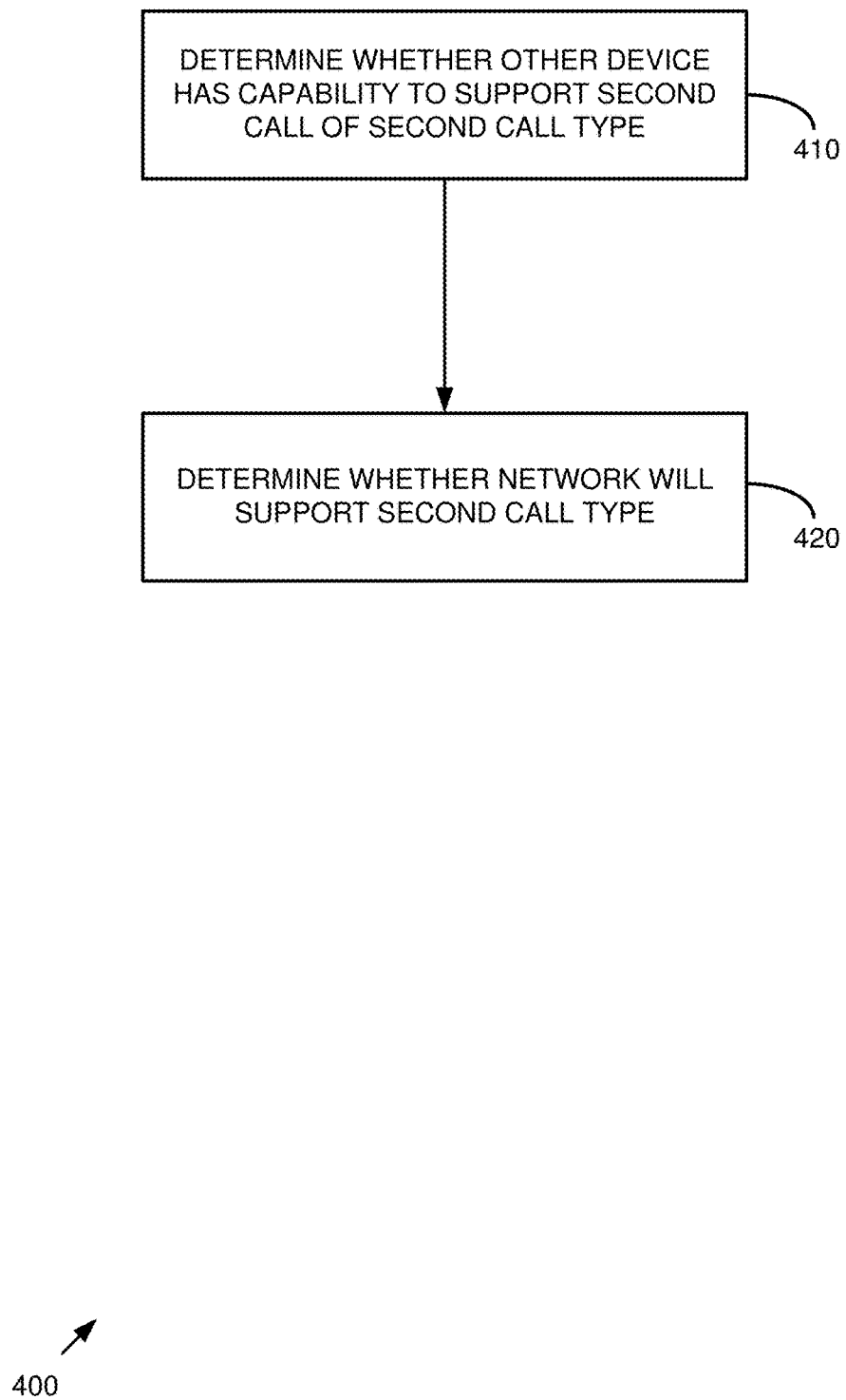
FIG. 4 is a flowchart of an exemplary method of determining whether seamless call transitions are possible.

FIG. 4 is a flowchart of an exemplary method 400 of determining whether seamless call transitions are possible and can be implemented, for example, in the system shown in FIG. 3. Although other arrangements are possible, in practice, the method 400 is typically invoked during communications with another device via a call of a first call type. The method can be implemented to preserve the seamless nature of the call transition. For example, a simple user interface option can be presented during a call when a seamless transition is possible instead of requiring navigation to a special or separate user interface.

In any of the examples herein, (e.g., before the method 400 commences, during the method 400, or the like) it can be determined whether a communication application of the second call type is available (e.g., installed, registered, configured to be active, or the like) at the local communication device. As described herein, if multiple communication applications supporting a particular call type are available, a favorite or preferred application can be stored for the call type. The preferred application can then be used throughout the seamless transition process. The determination can also include determining whether the application supports seamless transitions (e.g., to a particular call type).

If a communication application of the second call type is not available, an option can be displayed in the current user interface as described herein to obtain the application, activate it, configure it, or the like. Otherwise, responsive to determining that a communication application of the second call type is available, the method can continue. Thus, it is confirmed whether a communication application of the second call type is available at the local communication device.

At 410, it is determined whether the other communication device supports a second call of the second call type. As described herein, such a determination can be made in a variety of ways.

Determining whether the other device supports calls can be accomplished by querying local information about the other communication device. For example, a local contacts database (e.g., address book) can be checked to see if the other communication device (e.g., the number of which can be found via caller id or was dialed) or a user associated with the other communication device (e.g., the user is stored in local contacts as associated with the number of the current call) has an account with a service provider supporting calls of the second call type. If so, it can be assumed that the other device supports such calls. The address book can be enhanced or supplemented to indicate whether seamless transitions are possible. Information such as a platform type, platform version, application type, application version, and the like can be stored, consulted, or both to determine whether the other device can implement seamless transitions.

Other techniques include checking directly with (e.g., querying) the other communication device. Such a check can be made by handshaking between a local app and the remote app (e.g., or background versions of the app) that supports calls of the second call type. For example, if a preferred app is indicated for a particular call type, a query can be made to see if the other device has an instance or background listener in place of the app. Or, the call controller or other software can store such information to avoid having to invoke the applications.

Another technique is to query an application service (e.g., a server associated with the communication application supporting the second call type) to see if a number or contact (e.g., associated with the other device) is recognized. Recognition can include whether the number or contact is registered, active, or both.

To facilitate the determination, an application programming interface call can be defined for communication applications by which a local communication application can be queried to provide an answer concerning whether the other device has appropriate capabilities. Inputs can include a call type, a user identifier (e.g., number, address, or the like), or both.

At 420, it is determined whether a current network is able to support a call of the second call type. For example, if connectivity to certain types of networks is unavailable or unstable, the call type may not be possible. The communication device can store one or more network state indicators or network connectivity condition indicators to indicate the status of respective networks. Such networks can include wireless data connections provided by mobile operators (e.g., 3G, 4G, 4G LTE, WiMAX, or the like), Wi-Fi connections, or the like. Different status indicators can be stored for different networks. Thus, determining whether it is possible to seamlessly transition can comprise determining whether a network connectivity condition indicator indicates that the second call type is possible.

If both of the determinations indicate that a seamless transition to a call of the second call type is possible (e.g., the other device has the capability and the network will support the second call type), then an option for initiating the transition can be provided as described herein. Other conditions can be incorporated into the determination.

Example 6—Exemplary Call Types

In any of the examples herein, the technologies can support a plurality of different call types. One call type that is nearly ubiquitous in contemporary communication devices is the standard (mobile) phone call (e.g., switched or managed via a mobile operator infrastructure), that is sometimes called a "cellular call," even though the underlying technology may not be cellular. Other call types include VoIP calls, which in some implementations can be further divided into voice-only VoIP calls, video VoIP calls, and the like. RCS or RCS-e call types can also be supported.

The technologies can support a variety of ways of designating call types. For example, calls orchestrated by different communication applications that share certain characteristics can be considered to be the same call type (e.g., Skype calls and Viber calls are considered to be of the video call type). Or, such calls can be implemented as different call types (e.g., one call type for a Skype call and another call type for a Viber call).

In practice, different call types can be accomplished through different channels or over different networks. However, some or all legs can share the same network infrastructure.

Example 7—Exemplary Communication Application Types

In addition to a communication application ("app") that supports standard phone calls, in any of the examples herein, a wide variety of other communication application types (e.g., non-phone call apps) can be supported on a single device. In practice, such communication applications can be provided by different (e.g., third-) parties (e.g., provided and maintained by an entity other than the entity that provides and maintains the software for the phone operating system, call controller, the phone call app, or the like). Exemplary application types that can be supported include video applications, VoIP application (e.g., that can support video), and the like.

In practice, such application types can be associated with service providers who originate the software for achieving communications and maintain servers that facilitate connections or other functionality. For example, the Skype™ application provided by Microsoft Corporation, the Viber application provided by Viber Media Inc., the Tango™ application provided by TangoME, Inc., and others are available applications that can be supported. Various RCS and RCS-e applications provided by mobile operators can also be supported.

Further, within a particular service, there may be different actual applications for different platforms or versions of hardware. For example, a Skype™ application may be implemented on a variety of operating systems. Thus, a single service provider can originate communication applications to be implemented across different platforms (e.g., operating systems). For example, a Skype™ communication application can be provided on the various Windows® operating systems originating from Microsoft Corporation, the iOS and Mac OS operating systems originating from Apple Inc., the Android™ operating system originating from Google Inc., and the like. For purposes of convenience, such a collection of applications is sometimes called an "application family" associated with a communication service.

Thus, a counterpart application on another device need not be the same actual application. A counterpart application for a different platform can be used to establish communications. The technologies herein can distinguish the different versions and platforms to determine whether seamless call transitions are possible and then implement them accordingly.

The applications can serve as endpoints for the calls. Thus, a seamless transition can transition from one set of endpoints (e.g., phone call applications) to another set of endpoints (e.g., applications in an application family associated with a communication service).

Example 8—Exemplary Auto-Detection of Capabilities

Auto-detection of the other communication device's installed communication applications that support seamless call transitions can be implemented to determine if there is any intersection with applications at the local device. So, if both devices have an application in common that supports seamless call transitions to a call of the second call type, the shared application can be designated as the one to be used. If multiple applications are shared, user preferences can be consulted. In some cases, whether an application supports seamless transitions may depend on the platforms or version of the application.

It can thus be determined that the parties engaged in the first call both subscribe to the same service. An seamless upgrade to a call type supported by the service can then be accomplished.

Example 9—Exemplary Implementation: Upgrade to Video Call

The technologies described herein can be implemented to upgrade a voice phone call to a video call. In such a case, the first call type is a phone call (e.g., audio with no video), and the second call type is a video call (e.g., typically video and audio via VoIP). Language and icons indicative of video can be used throughout the user interface to indicate that a call can be upgraded to video using the seamless call transition technologies described herein. Thus, the seamless transition upgrades from an audio call to a video call.

So, for example, when two parties are talking as part of a cellular call, they can upgrade the cellular call to a video call by seamlessly transitioning the call to a video call type.

Such an implementation can be accomplished with a system comprising an executable audio calling application and an executable video calling application. The call controller can be configured to seamlessly transition a call from the audio calling application to the video calling application.

Example 10—Exemplary Implementation: Upgrade to VoIP

The technologies described herein can be implemented to upgrade a cellular phone call to a VoIP call. In such a case, the first call type is a cellular call (e.g., audio with no video), and the second call type is a VoIP call. Language and icons indicative of VoIP can be used throughout the user interface to indicate that a call can be upgraded to VoIP using the seamless call transition technologies described herein. Thus, the seamless transition upgrades from a cellular call to a VoIP call.

So, for example, when two parties are talking as part of a cellular call, they can upgrade the VoIP call to a video call by seamlessly transitioning the call to a VoIP call type.

Such an implementation can be accomplished with a system comprising an executable phone calling application and an executable VoIP calling application. The call controller can be configured to seamlessly transition a call from the phone calling application to the VoIP calling application.

Example 11—Exemplary User Interface Option to Invoke Seamless Call Transition In any of the examples herein, a user interface option can be presented by which seamless call transition can be invoked. As described herein, such an option can be presented conditionally, based on whether such a call transition is possible.

Figure 5:
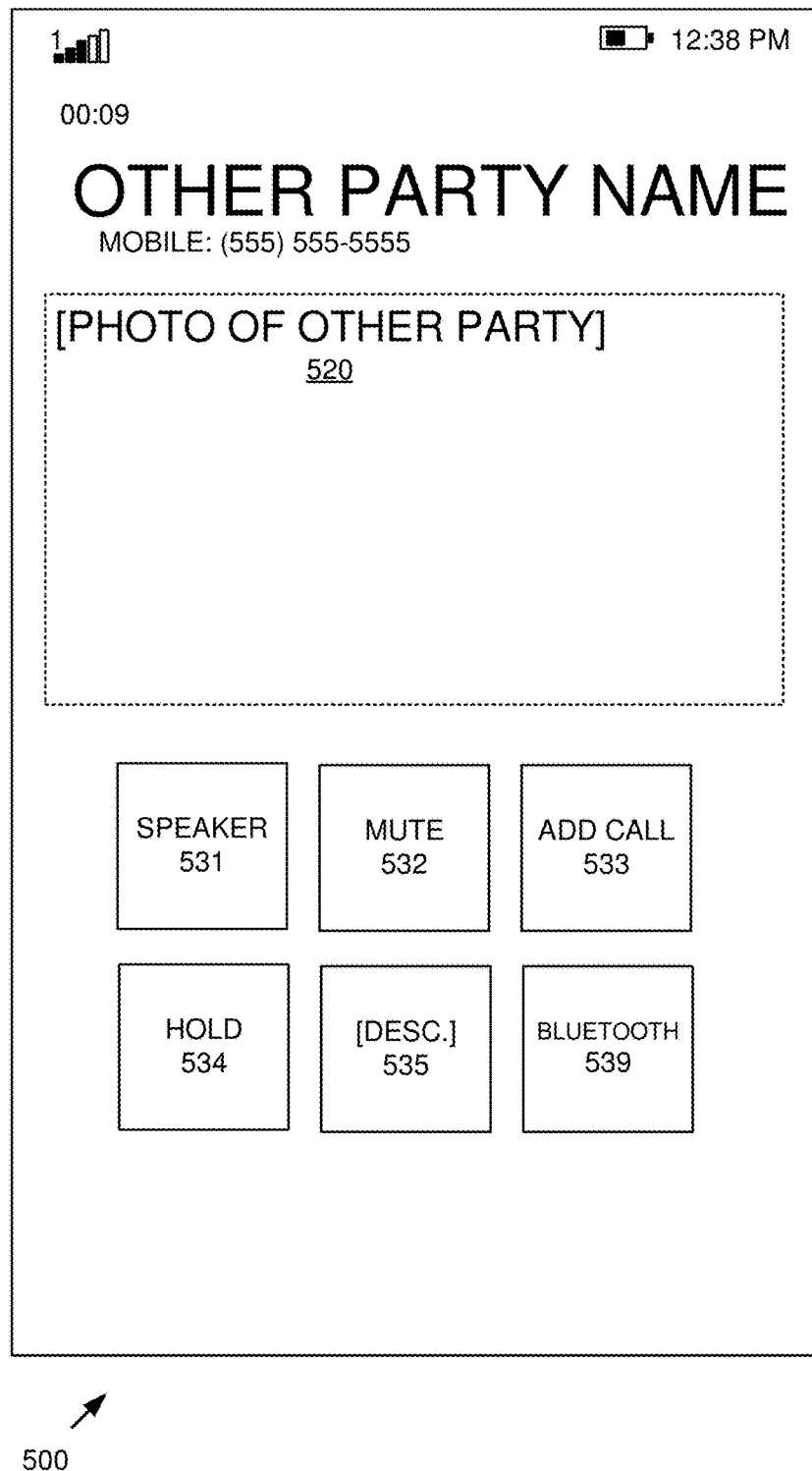
FIG. 5 is a wire frame of an exemplary call progress user interface implementing a seamless call transition.

FIG. 5 is a wire frame of an exemplary call progress user interface 500 and includes an activatable user interface element 535 for initiating the transition. In practice, the user interface element 535 can be depicted as disabled (e.g., greyed out, faded, or the like) when not available and enabled when available. For example, the user interface element can be depicted as disabled when network conditions do not support the second call type.

The user interface element 535 can incorporate a description, text, logo, graphic, or other information that indicates which application or call type (e.g. of the second call) is involved. For example, for transitions to a video call type, a video camera or similar icon can be shown.

In the example, the user interface element 535 is depicted as part of a call progress (e.g., ongoing call, in-call, or mid-call) user interface while conducting the first call. The user interface includes a photograph 520 of the other party, and various other user interface elements for controlling a current call (e.g., speaker button 531, mute button 532, add call button 533, hold button 534, and Bluetooth button 539). In practice, other or additional user interface elements can be shown.

In cases where seamless call transitions are not available because no applicable communication application is installed, a user interface element can still be presented. Thus, it can be determined that an application for supporting calls of the second type is not installed on the communication device, and an option as part of a call progress user interface can be presented to initiate an installation process for the application on the communication device.

Such a user interface element can call attention to the fact that an application supporting seamless call transitions could be installed (e.g., via an icon, graphics, text, color, or the like). Activation of the user interface element can lead to displaying a list of supported communication applications. Activation of an application in the list can result in navigation to a marketplace page where the application can be acquired. Or, activation of the user interface element can result in direct navigation to an app marketplace or marketplace page where an appropriate communication app can be purchased.

Although the user interface element 535 can be enabled upon determination that a call transition is possible, the determination need not be completely accurate. For example, it may be that the other party no longer subscribes to the relevant service, or that network conditions have since deteriorated.

An implementation can support multiple user interface elements 535 for transitioning. For example, different elements can be presented for different call types, different services, or different call features (e.g., video, screen sharing, or the like). Or, a single element 535 can support multiple call types (e.g., via tap and hold, learning user behavior, or the like).

If desired, a preference can be set so that transitions automatically take place when available.

Example 12—Exemplary Activation

In any of the examples herein, a user interface element can take the form of a displayed or implied user interface element that can be activated by a user. Such elements can take the form of tiles, icons, graphical buttons, areas, items in a list, shapes, sliders, or the like, presented as part of a graphical user interface. The user interface element can include text, graphics, or color to indicate functionality.

An activation (e.g., of an activatable user interface element) can take the form of user input indicative of selection (e.g., of the activatable user interface element). For example, in systems supporting touch, a tap, hover, or other touch gesture can be received. Other systems can support clicking, hovering, voice activation, blinking, winking, and the like.

Example 13—Exemplary Contact Points

In any of the examples herein, various number or address types can be supported (e.g., home, mobile, work, or the like). A contact point can take the form of a number or address associated with a contact. For example, a contact point can be a phone number or user address for a contact, such as a work number for a contact, a mobile number for a contact, or a home number for a contact.

When determining the identity of a party using the other communication device, the phone number of the other communication device can be used to search for a contact that has a matching contact point. The contact entry may then be used to find a number or user address for the communication application that is orchestrating the second call. For example, a phone number can be used to determine a user address for a VoIP call.

Example 14—Exemplary Consent

In any of the examples herein, an opportunity can be given to consent to the call transition at the other communication device before the second call is activated or initiated. For example, when transitioning to a call type that supports video, the other party may not wish their device to send video.

A user interface can be displayed that obtains consent from a user. Information about the requesting party and type of call can be shown (e.g., "Ellen is requesting that the call now include video. OK?"). Responsive to receipt of consent, the transition can continue.

To obtain the attention of the user, a tone or other audio indication can be played when asking for consent.

If desired, consent can be implemented so that the call transition still takes place while respecting the user's intent. For example, the call can be upgraded to VoIP, but video from the non-consenting side is not included. Or, additional options can be presented to the user. For example, independent consent for upgrade and inclusion of video can be implemented.

In some cases, consent may not be supported, and the experience from the callee's side may not be that of a seamless transition on the callee's side (e.g., the incoming call appears as an incoming call).

Example 15—Exemplary Method of Transitioning a Call

Figure 6:
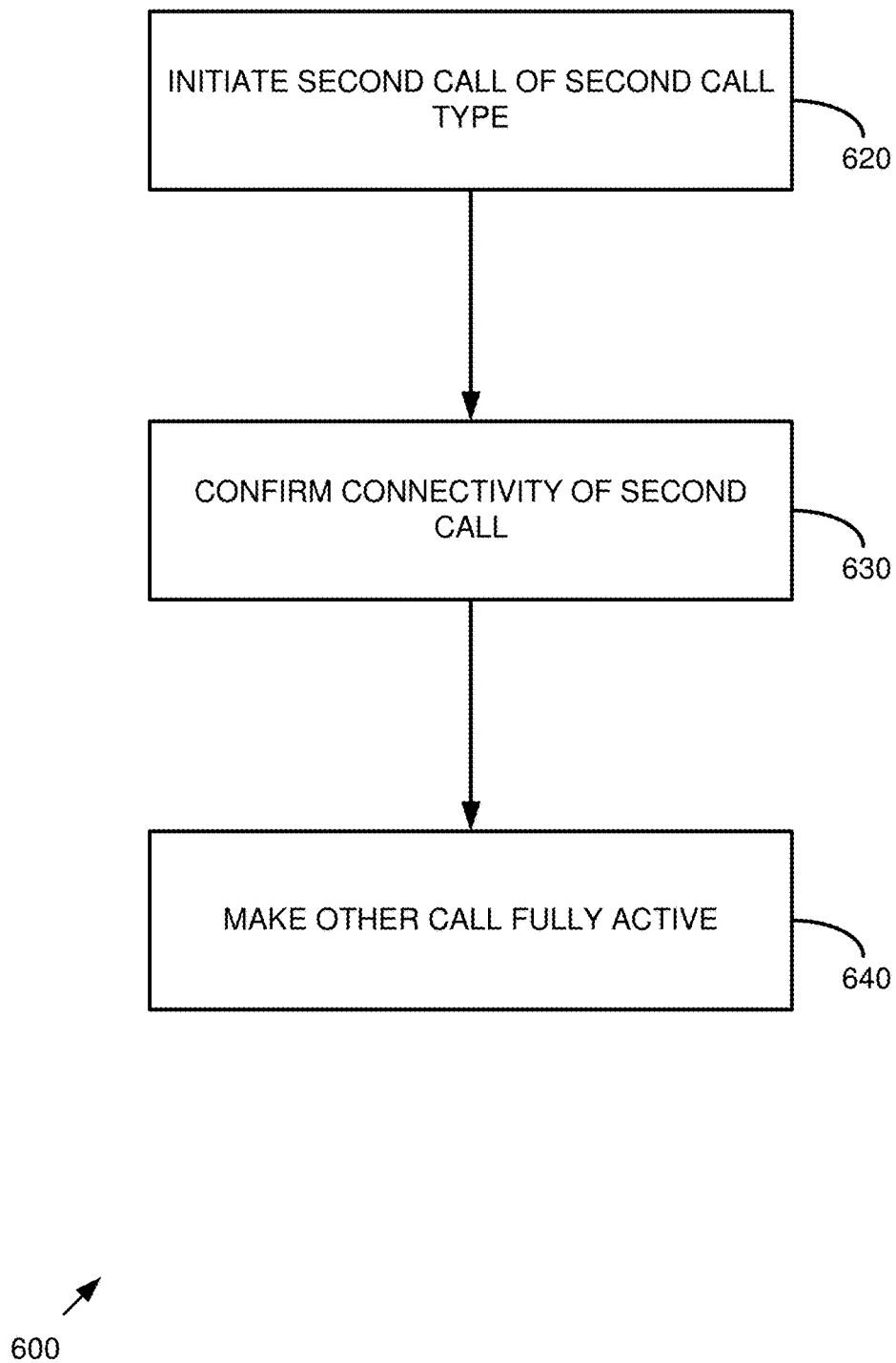
FIG. 6 is a flowchart of an exemplary method of transitioning a call.

FIG. 6 is a flowchart of an exemplary method 600 of transitioning a call and can be implemented, for example, in the system shown in FIG. 1. A system implementing the method can also include a unique identifier of the first call and audio suppression logic as described herein.

At 620, a second call of a second (e.g., different from the first) call type is initiated from the local communication device to the other communication device. The call can be placed in the background (e.g., is not presented to the user as a separate call). Meanwhile, the first (e.g., current) call is kept active. For example, if a second call typically results in the first call being placed on hold, such functionality can be inhibited. As described herein, the audio of the second call can be suppressed.

Although the second call can be placed in the background, some indication of progress can be provided without giving the impression that a second call has been made. For example, while waiting for connection, a marquee, animation, or other mechanism indicative of preparing for the transition can be shown. Also, the user interface element that initiated the transition can be disabled.

At 630, connectivity of the second call is confirmed. For example, it can be determined whether the second call was successfully established with the other communication device. Thus, the second call is established (e.g., over a second channel) while maintaining the first call. If for some reason connectivity is not successful (e.g., after n seconds), the process can fail, and the first call still continues.

At 640, responsive to confirming connectivity of the second call, the second call can be made fully active. In some implementations, the first call can then be placed on hold, terminated, dropped, or otherwise become inactive. To facilitate deactivation of the first call, a unique identifier can be used to identify the first call. To avoid undesirable or unauthorized deactivation of the first call, a simplistic unique identifier can be avoided. Instead, a more complex (e.g., GUID or the like) identifier generation scheme can be used to identify the call.

As part of the transition, audio resources can be switched to better facilitate the second call type. For example, if the second call type is video, the audio can be switched from device earpiece to speaker to facilitate use of the camera. If Bluetooth audio is being used, then the audio resources need not be switched.

As described, the method 600 can accomplish switching applications (e.g., switching between a call supported by one application type to a call supported by a different application type) while maintaining the impression that a single call is involved.

When transitioning to call types that include video, local video can be shown on the device (e.g., to give the user an opportunity to check appearance) during an interstitial period before the local video becomes visible to the other communication device. Audio from the first call can continue during the interstitial period.

On the callee's device, the seamless transition can be implemented in a similar manner. However, the incoming call can be denoted as a special call that is to be treated as part of seamless transition. So, instead of showing the incoming call as an incoming call, it can be handled in the background, and transition to the incoming call can then be accomplished seamlessly. Consent can be obtained as described herein.

In some cases, network conditions may deteriorate, prompting a transition back to the call type of the first call. Such a transition can be performed seamlessly as described herein. Consent of the other party may not be possible or required (e.g., when removing video from a call).

Example 16—Exemplary Suppression of Audio

In any of the examples herein, audio for a second call can be suppressed before it is made active. Such a technique can avoid doubling of audio, echoing, and the like. Call suppression can be controlled by the call controller or other component.

Example 17—Exemplary User Interface Sequence

In any of the examples herein, the user interface can sequence between the original user interface (e.g., a call progress UI) and the user interface of the communication application supporting the second call. Upon completion of the transition, it appears that the first call transformed into the second call. The functionality of the second call type is then presented for use at the communication device.

At the other device, a request for consent can be shown, after which the user interface transitions into that supporting the second call.

Example 18—Exemplary Call Transition State

In any of the examples herein, a call transition state can be stored to help orchestrate the transition process. Such a state can be implemented in conjunction or as part of a call state. For example, the state can indicate "not implemented," "inactive," "initiating second call," "completed," or the like.

Similarly, as described herein, a network state indicator can be stored.

Example 19—Exemplary Method of Registering a Communication Application

Figure 7:
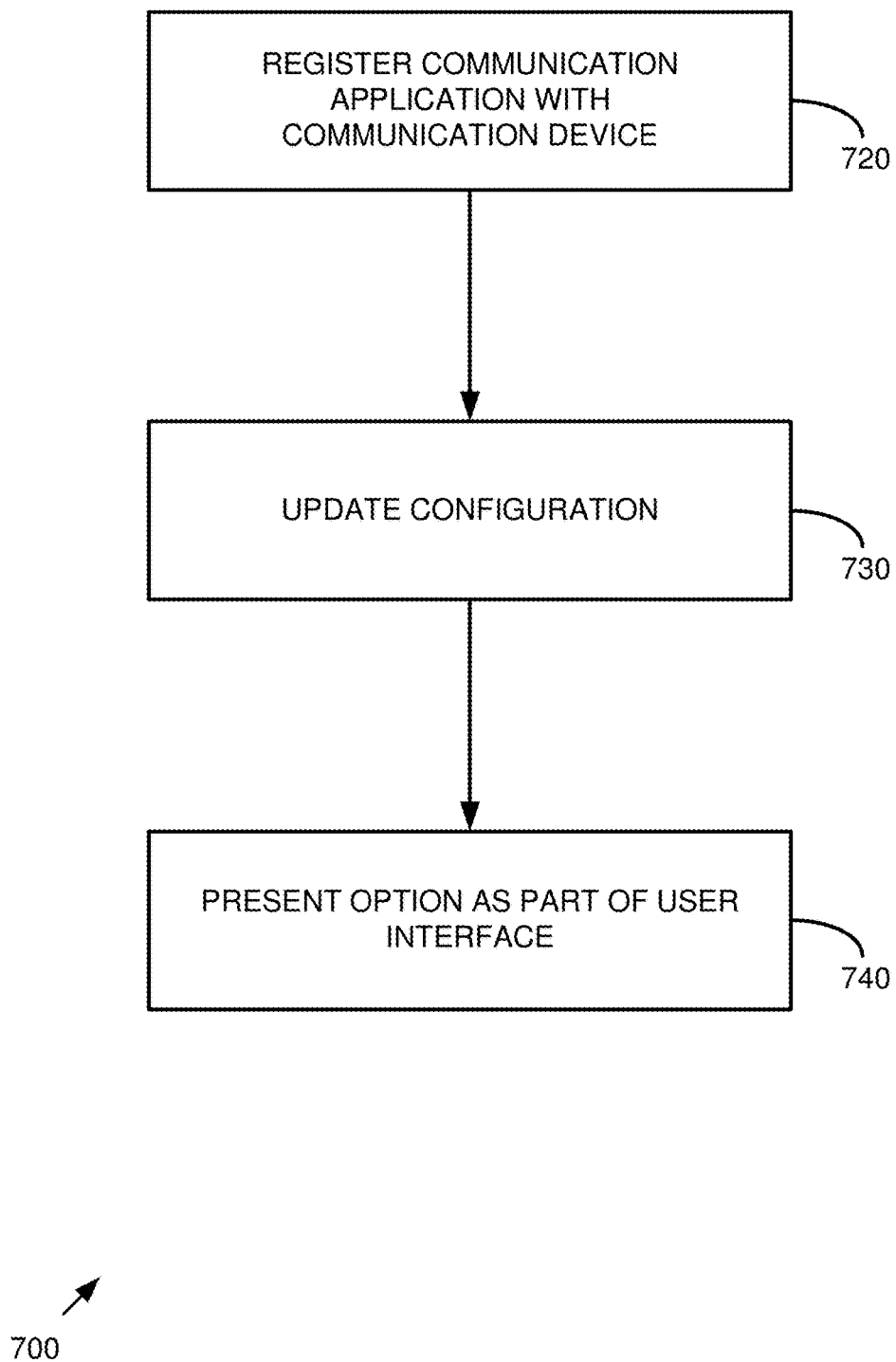
FIG. 7 is a flowchart of an exemplary method of registering a communication application to accomplish seamless call transitions.

FIG. 7 is a flowchart of an exemplary method 700 of registering a communication application to accomplish seamless call transitions and can be implemented, for example, in any of the communication devices described herein.

At 720, a communication application is registered with a communication device. For example, an operating system or other controlling software can receive a notification that a communication application is being installed, that it supports one or more call types, and that it supports seamless call transitions.

At 730, responsive to the registration, the configuration of the communication device is updated. For example, a list of communication applications that support a particular call type can be updated by adding the communication application to the list. A preferred communication application for a particular call type can also be stored.

At 740, as a result of the registration, an option for seamlessly transitioning to a second call of a type supported by the communication application is presented in a user interface of the communication device. As described herein, such an option can be presented conditionally or conditionally enabled (e.g., depending on capabilities of the other communication device, network conditions, and the like).

Thus, during installation of an application supporting a second call type, the application can be registered as to be used when conducting seamless transitions via the second call type. Subsequently, a user interface element indicating the second call type or the application can be presented responsive to the registering.

Example 20—Registered Communication Applications

FIG. 8 is a block diagram of a table 800 storing a preferred communication application and can be stored as part of configuration data (e.g., transitions configuration data 130). The table 800 can store entries 830 that indicate an application 830A and whether the application is preferred 830B. The table can be built and updated when communication applications register. Then, the table can be consulted when determining whether or which application to show when presenting a user interface option for seamless call transitions. For example, if Application 3 is the preferred application, it can be indicated as the application invoked when the user interface option is activated (e.g., by text, graphics, logo, or the like).

Other information (e.g., text, icon, logo, or other graphic) can also be stored or referenced in the table and displayed as part of the user interface element (e.g., as part of a call progress UI). The table can explicitly indicate whether an application supports seamless transitions, or the table can be limited to such communications applications. A separate preference can be set for purposes of seamless transitions. So, if there are multiple applications that support a particular call type, a subset may support seamless transitions. If there are multiple applications in the subset, a particular one of the communication applications can be designated as preferred.

Although the example shows communication applications for a single call type, multiple call types can be supported. Different applications can be indicated as preferred for different call types.

Example 21—Exemplary Configuration of Communication Applications

Figure 9:
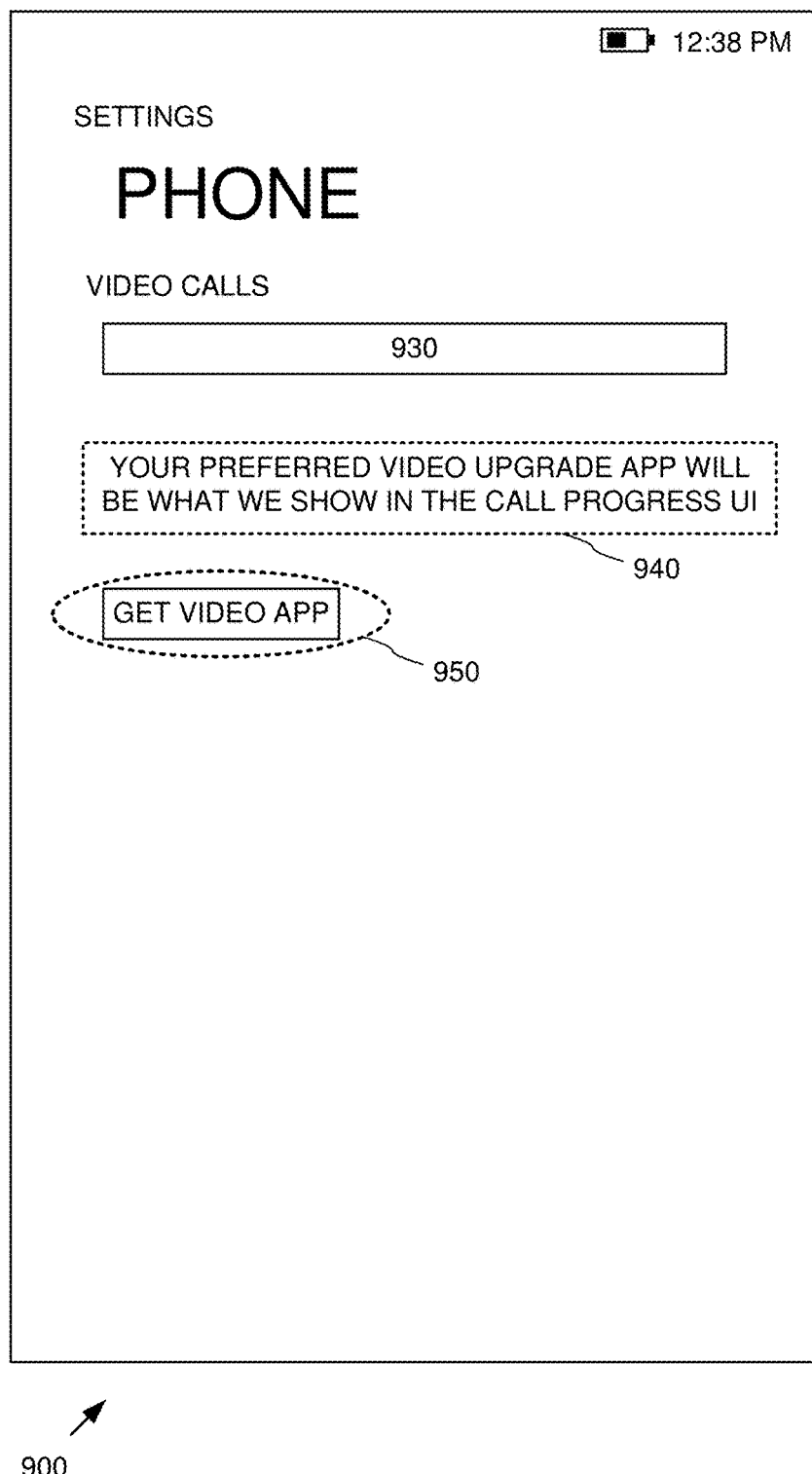
FIG. 9 is a wire frame of an exemplary settings user interface for choosing a preferred application for a call type.

FIG. 9 is a wire frame of an exemplary settings user interface 900 for choosing a preferred application for a call type. In the example, a user interface for selecting a preferred communication application for a particular type of call (e.g., video) is shown. User interfaces for other or additional call types can be supported.

The preferred application can be shown in box 930. If more than one communication application is available, the box 930 can be a drop down box that allows selection of a different application. Preferences as described herein can then be updated accordingly.

Explanatory text 940 can be shown to describe the result of choosing a particular application (e.g., that the selected application will be shown in the call progress UI). If no applications are installed, the interface can display text 940 indicating the results of obtaining a supporting communication application. For example, the text can describe the benefits of having video, the availability of seamless call transitions, etc. (e.g., "Did you know that you can upgrade a call to a video call with an upgrade app?").

The user interface 900 can display a user interface element 950 that allows navigation to an application marketplace where a supporting application can be obtained as described herein.

An alternative technique can allow an application to set itself as the preferred application for a particular call type. Applications need not have direct access to the settings. For example, during registration, an application can access an API (e.g., specifying the call type, an application identifier, or the like) to set itself as the preferred application. To prevent surreptitious changes to configuration, a dialog box can be displayed to confirm the change (e.g., "Make Application x your preferred video application? Yes/No"). An application can query the API to see if it is already preferred. If so, no change is required.

Example 22—Exemplary Advantages

As described herein, users can easily take advantage of their device's capabilities without having to learn new processes or even initially be aware that such capabilities exist.

Example 23—Exemplary Call Escalation

In the following examples, a particular type of call transition (e.g., audio-only call to video call) is used to illustrate a technique sometimes called "call escalation." Such call escalation can comprise a seamless call transition (e.g., be a seamless call escalation). In other cases, escalation can be implemented without being seamless. Seamlessness can be implemented by transitioning from the audio-only call to the video call while maintaining the impression that a single, unified call is taking place using any of the techniques described herein. For example, instead of providing an explicit indication that the audio-only call has ended (e.g., an "ended" message for the audio-only call), such an indication can be suppressed or otherwise not presented. Further, an incoming video call that is associated with the audio-only call (e.g., is an escalation of the audio-only call) can be handled in a special way, rather than presenting it as an incoming video call. For example, a notification as described can be displayed while maintaining audio for the current audio-only call. Rather than presenting the incoming video call as a separate call, it can be presented as an opportunity to add video to the current call, thus maintaining the impression that a single call is taking place, even though different technologies, network types, client applications, or the like are involved.

Although an example of escalating from an audio-only call to a video call is used, other types of escalation can be supported (e.g., escalating from a video call to a holographic call, or the like) in any of the examples herein.

Example 24—Exemplary Pinpoint Call Escalation System

Figure 10:
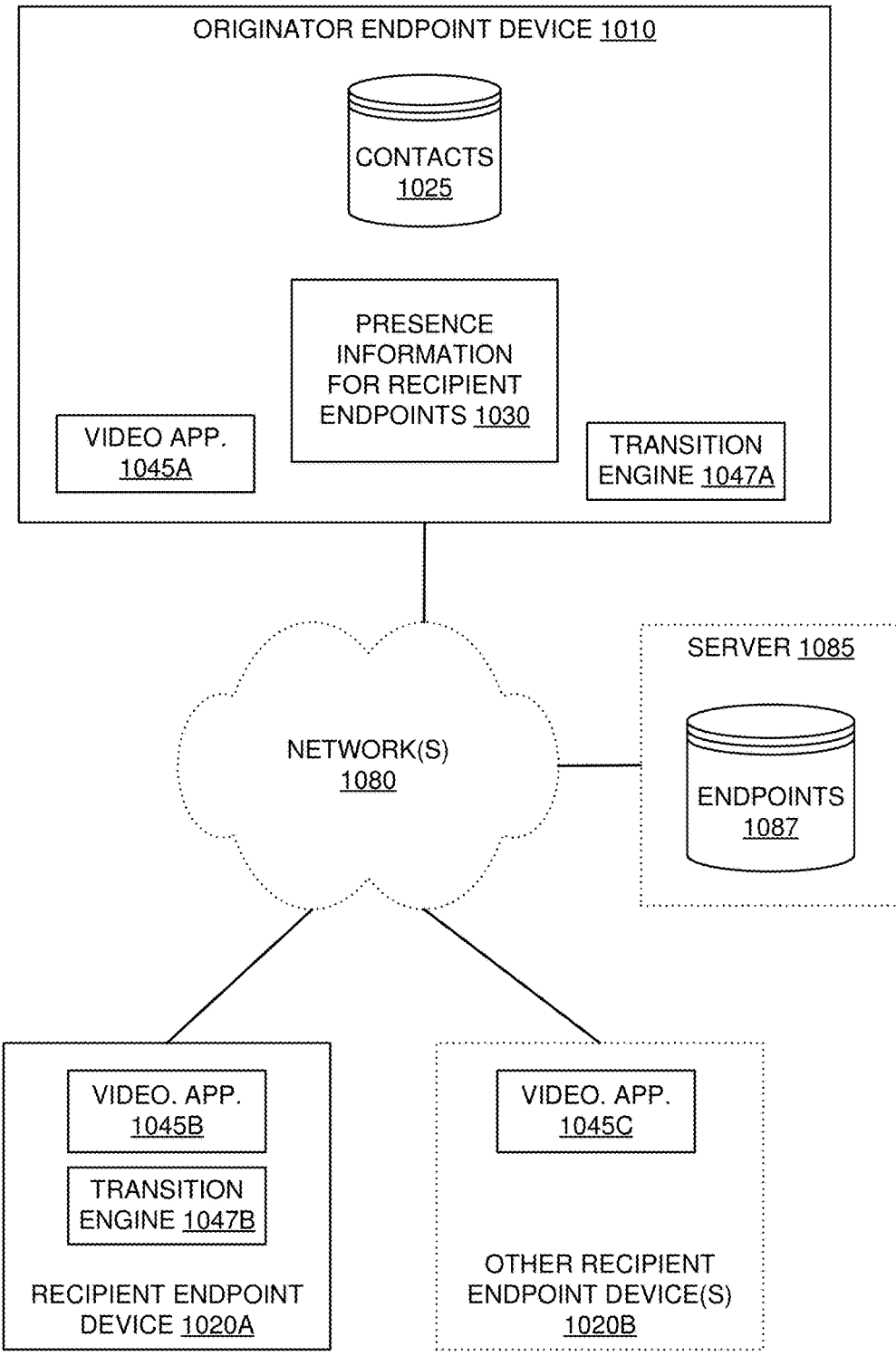
FIG. 10 is a block diagram of an exemplary system implementing pinpoint call escalation.

FIG. 10 is a block diagram of an exemplary system 1000 implementing pinpoint call escalation. In the example, two communication devices 1010 and 1020A are conducting an audio-only call (e.g., over a public switched telephone network, cellular call, or the like). For purposes of explanation, the device 1010 is sometimes called the "originator endpoint device" because it is the one from which an invitation to escalate the call originates. The communication device 1020A is sometimes called the "recipient endpoint device" because it is the one that receives the invitation to escalate the call. The one or more other communication devices 1020B are other endpoint devices that are associated with the same user as the endpoint device 1020A and may be currently online (e.g., in communication with the server 1085 or powered on and activated) and can be capable of engaging in video calls. However, as described herein, escalation invitations are not sent to such devices because they are not currently engaged in a call with the originator endpoint device 1010.

As shown, the originator endpoint device 1010 can store contact information 1025 and execute a video application 1045A. The video application 1045A can handle the video call and can communicate with the server 1085 to determine which of the recipient endpoints is currently engaged in the audio-only call. Alternatively, such processing can be performed by another part of the system, or the video application 1045A can simply consult the presence information 1030.

A transition engine 1047A can handle transition and invitation functionality as described herein. In practice, the transition engine 1047A can be separate as shown, part of the video application 1045A, part of a larger communication application, part of the operating system, or the like. The transition engine 1047A can be operable to present call escalation as a single call, even though two calls are involved.

Within the originator endpoint device 1010, presence information 1030 for a plurality of devices associated with the recipient user can be stored. Such information can indicate which of the plurality of recipient endpoints 1020A-B is currently engaged in an audio-only call. Such information can indicate the network addresses of the endpoint devices 1020A-B and specially denote the endpoint device 1020A out of the endpoint devices 1020A-B that is involved in the audio-only call. Such information can be based on information published from the recipient endpoint device 1020A as described herein. The information 1030 can thus take the form of a device-specific indication of being engaged in an audio-only call (e.g., the current audio-only call). A device-specific identifier or call-specific identifier can serve as a device-specific indication.

Although the term "presence information" is used, the information can take the form of limited presence information (e.g., only information regarding whether the device is involved in an audio-only call or the current audio-only call is exposed). Other presence information (e.g., location, last time active, and the like) can remain unexposed.

As shown, the devices 1010 and 1020A-B can be interconnected via any of a variety of networks 1080, including one or more of the described public switched telephone network, the Internet, private networks, or the like. The server 1085 can also be so connected.

In some scenarios, it may be desirable to involve a server 1085, which can track presence information and other data in an endpoints database 1087. For example, the server 1085 can store information about the plurality of recipient endpoints 1020A-B associated with the recipient user name. Thus, the server can act as a liaison between the devices. For example, the server can orchestrate the invite so that a single recipient endpoint device is invited to escalate the audio-only call. However, under certain conditions, the server 1085 can remain uninvolved, allowing the devices to negotiate connections and call escalation.

As shown, the recipient endpoint device 1020A involved in the audio-only call can include a video application 1045B and a transition engine 1047B similar to that of the other device 1010. The endpoint device 1020A can also publish its presence information to the network 1080, for consumption by the endpoint device 1010, either directly or through the server 1085. For example, the server 1085 can receive an indication that the endpoint device 1020A is engaged in an audio-only call and report such information to the originator device (e.g., and other devices). The recipient endpoint 1020A can be configured to respond to the call escalation and orchestrate a seamless call transition from the audio-only call to the video call (e.g., the audio-only call is ended without presenting an ended message for the audio-only call or the like).

Example 25—Exemplary Pinpoint Call Escalation Method

Figure 11:
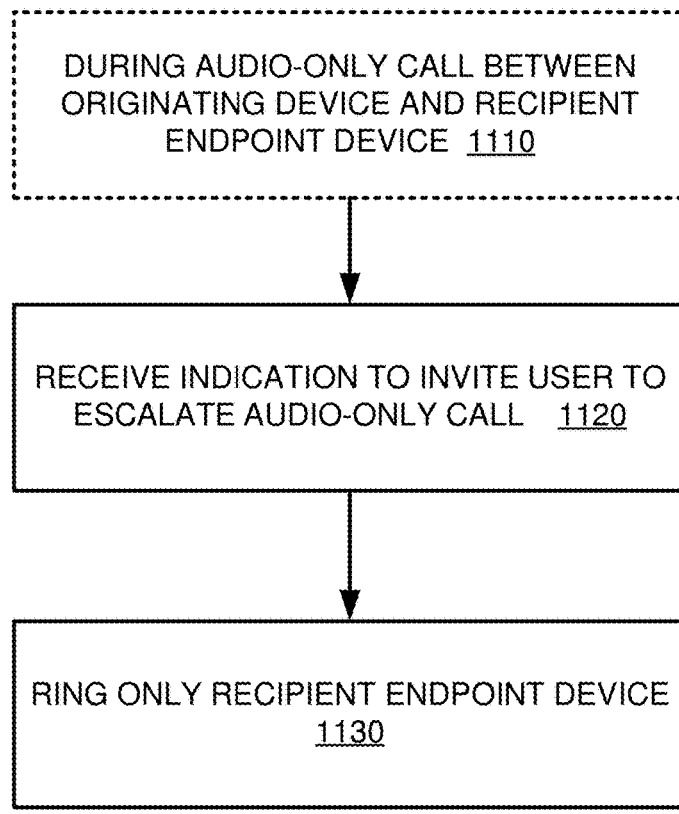
FIG. 11 is a flow chart of an exemplary method of implementing pinpoint call escalation.

FIG. 11 is a flow chart of an exemplary method 1100 of implementing pinpoint call escalation that can be implemented in any of the examples described herein.

In the example, the method 1100 is performed 1110 during an audio-only call between a particular recipient endpoint device and an originating device. The recipient endpoint device is associated with a user identifier currently active (e.g., online, logged on, or the like) at a plurality of endpoint devices (i.e., including the recipient endpoint device) (e.g., that are capable of engaging in a video call).

At 1120, a request to escalate the audio-only call to a video call is received. For example, after showing a user interface, sending a message, or other technique, an indication to invite the recipient user to escalate the audio-only call (e.g., "add video") can be received.

At 1130, responsive to the request only the recipient endpoint device (i.e., the one engaged in the audio-only call) is rung. Other devices are not rung (e.g., the invitation is not received, not displayed, or both). For example, an invitation to escalate the audio-only call can be sent to or displayed at the particular endpoint device only.

Example 26—Exemplary Pinpoint Call Escalation Method

Figure 12:
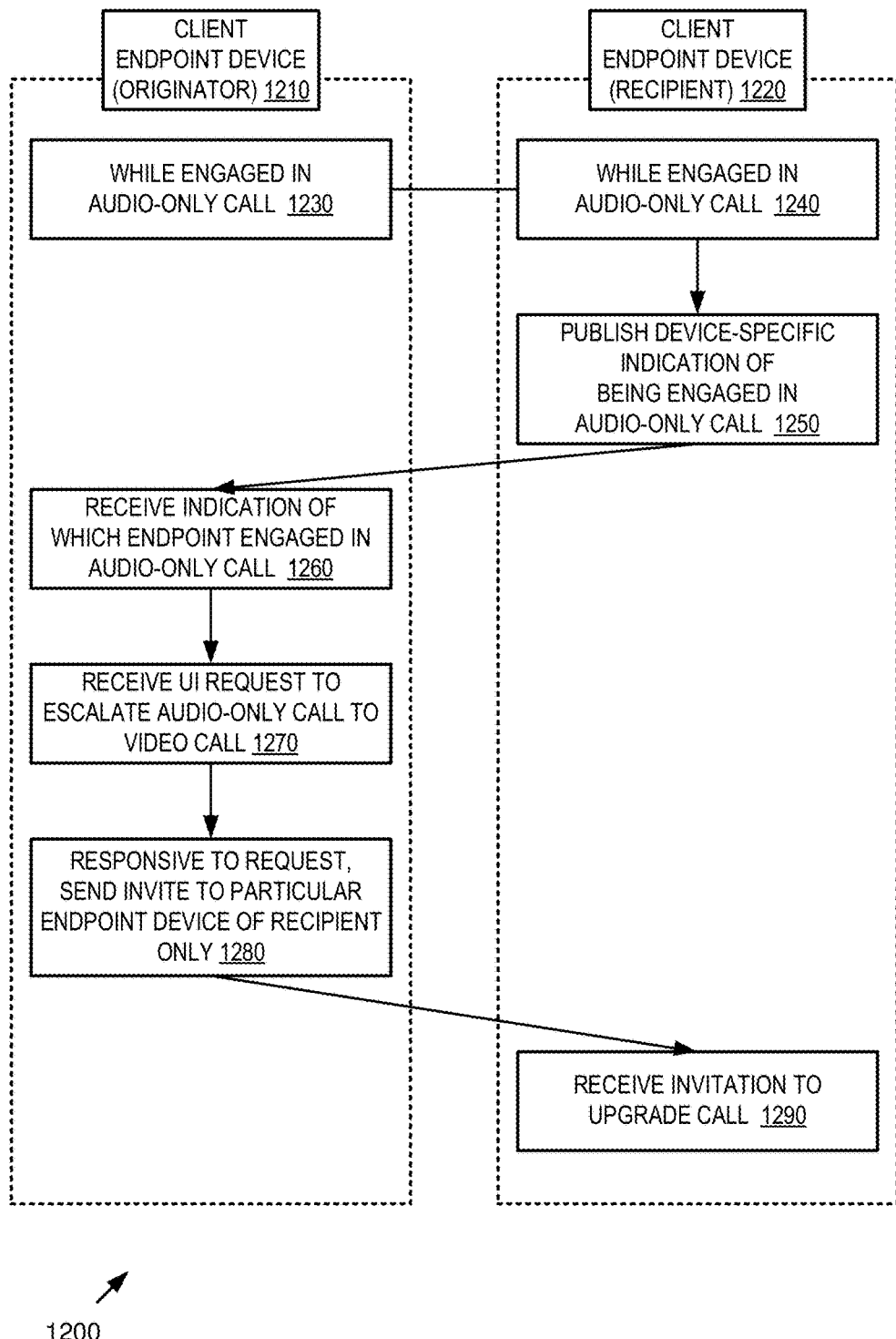
FIG. 12 is a flow chart of an exemplary method of implementing pinpoint call escalation from the perspective of different devices.

FIG. 12 is a flow chart of an exemplary method 1200 of implementing pinpoint call escalation for the perspective of different devices that can be implemented in any of the examples described herein and can be used to accomplish the method 1100 of FIG. 11. In the example, the client endpoint devices 1210, 1220 are engaged in an audio-only (e.g., public switched telephone network, cellular call, or the like) call 1230, 1240. Both devices 1210, 1220 are therefore active. However, as described herein, a user associated with the recipient device 1220 may have one or more other devices that are active or inactive (e.g., and that are capable of engaging in a video call). For example, the user can have other devices registered with the communication service, be logged in as a user of a video calling service on other devices, or both.

At 1250, while engaged in the audio-only call, the recipient client endpoint device 1220 publishes a device-specific indication of being engaged in the audio-only call. As described herein, the indication can indicate a unique device address of the device 1220, a unique call identifier of the audio-only call, or both.

Also while engaged in the audio-only call, the originator client endpoint device 1210 receives an indication of which endpoint (e.g., 1220) is engaged in the audio-only call. As described herein, such an indication can be received directly or through an intermediary, such as a server. Such an indication can be received before the request to escalate the call is accepted. Thus, a device-specific indication can be received before the escalation invitation is sent or accepted. As described herein, such functionality can be handled by an intermediary, such as a server.

Indications of the plurality of endpoint devices associated with the user identifier can be stored. The particular endpoint device engaged in the audio-only call can be specially denoted.

At 1270, a request (e.g., via a user interface) is shown at the originator device 1210 to escalate the audio-only call to a video call. For example, a user interface option (e.g., user interface element) to escalate the audio-only to a video call can be presented, and a user can activate a user interface element such as a graphical push button (e.g., in a call progress user interface while conducting the audio-only call) as described herein, causing the request to be received by the device.

At 1280, responsive to the request, the originator endpoint device 1210 sends an invite to the particular endpoint device of the recipient only (e.g., a pinpoint invite only to the device 1220 currently involved in the audio-only call with the originator device 1210). For example, the actual network device address of the recipient can be used, or a server can be asked to send the invite, which handles the pinpoint invite functionality. The other devices 1220 associated with the user of the recipient endpoint device 1220 are not sent an invite (e.g., the process omits to send the other devices the invite to escalate the audio-only call to a video call).

At 1290, the recipient endpoint device 1220 receives the invitation to escalate the call.

As described herein, if the invitation is accepted (e.g., an acceptance is received from the recipient endpoint device), the audio-only call can then be escalated to a video call. Such escalation can take the form of a seamless call transition from the audio-only call to the video call. The determination of which endpoint is engaged in the audio-only call can be made before the acceptance is received.

Example 27—Exemplary Other Pinpoint Call Escalation Method

Figure 13:
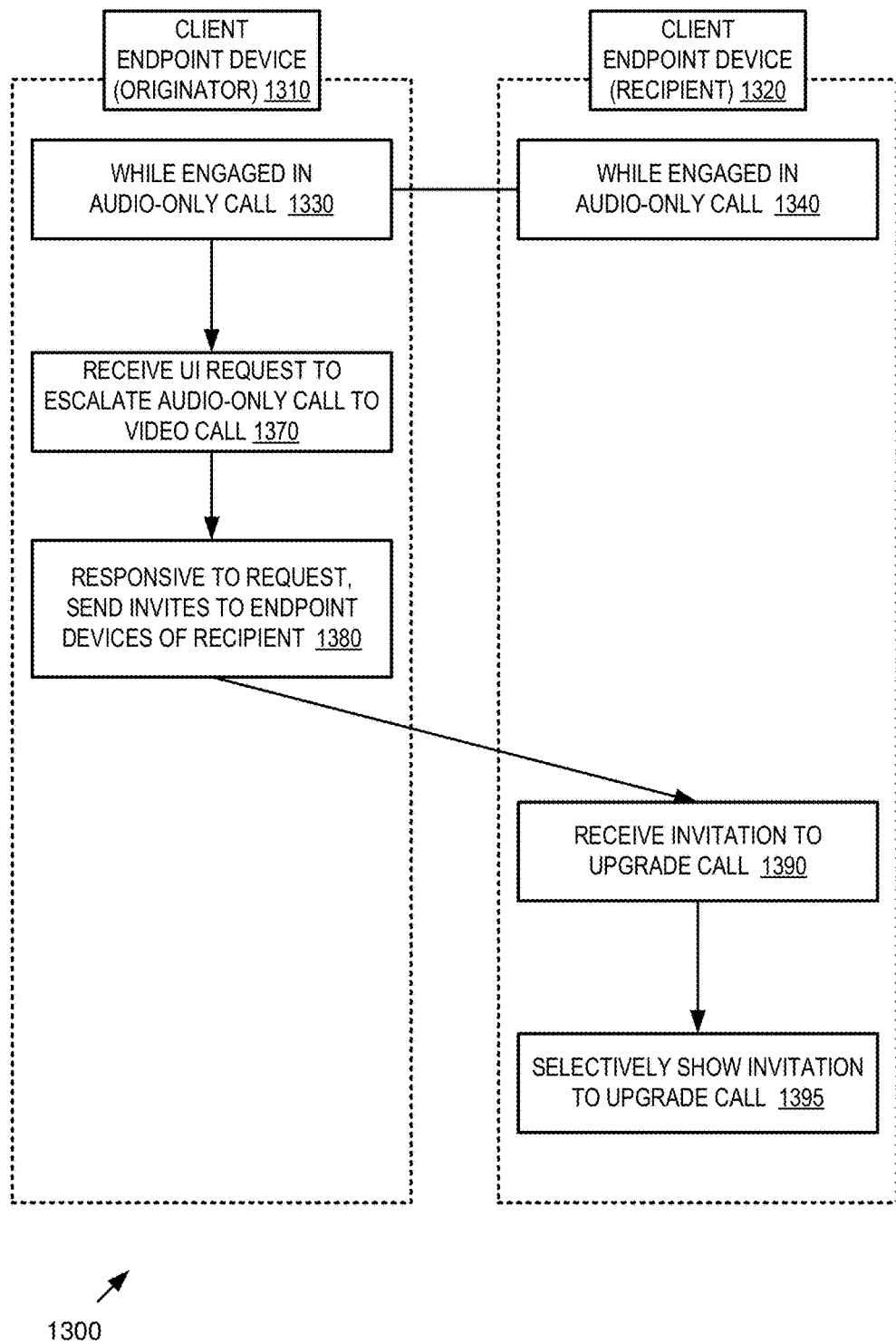
FIG. 13 is a flow chart of an exemplary other method of implementing pinpoint call escalation from the perspective of different devices.

FIG. 13 is a flow chart of another exemplary method 1300 of implementing pinpoint call escalation for the perspective of different devices that can be implemented in any of the examples described herein and can be used to accomplish the method 1100 of FIG. 11. In the example, the client endpoint devices 1310, 1320 are engaged in an audio-only (e.g., public switched telephone network, cellular, VoIP, or the like) call 1330, 1340. Both devices 1310, 1320 are therefore active. However, as described herein, a user associated with the recipient device 1320 may have one or more other devices that are active or inactive (e.g., and that are capable of engaging in a video call). For example, the user can have other devices registered with the communication service, be logged in as a user of a video calling service on other devices, or both.

At 1370, a request (e.g., via a user interface) is received at the originator device 1310 to escalate the audio-only call to a video call. For example, a user interface option (e.g., user interface element) to escalate the audio-only to a video call can be presented, and a user can activate a user interface element such as a graphical push button (e.g., in a call progress user interface while conducting the audio-only call) as described herein.

At 1380, responsive to the request, the originator endpoint device 1310 sends an invite to the particular endpoint device of the recipient 1320 along with other devices other devices associated with the user of the recipient endpoint device 1320. As described herein, if desired, the particular endpoint device 1320 can avoid the need to publish the fact that it is involved in the audio-only call, but the invitation can be still be limited to the particular endpoint device 1320.

At 1390, the invitation to upgrade the call is received at the device 1320 and other devices. It can be determined (e.g., locally at the device 1320) that the incoming video call is an escalation request to escalate the current audio-only call to a video call. The invitation to upgrade the call is selectively shown 1395, based on whether the device 1320 was the one engaged in the audio-only call being escalated. For example, a call identifier or user identifier associated with the incoming call notification can be checked to determine whether the incoming video call is an escalation of the current audio-only call. If it is determined that the incoming video call is an escalation of the current audio-only call, the invite can be presented for consideration by the recipient user as described herein.

Otherwise (e.g., the incoming call is an escalation of an audio-only call occurring at a different device), the incoming call can be avoided. For example, the invite can be ignored, suppressed, or the like (e.g., at the other devices associated with the user of the device 1320). In this way, the invitation is shown only at the proper endpoint device.

Example 28—Exemplary Server Involvement

In any of the examples herein, functionality described as performed by the devices can be performed by an intermediary (e.g., server) instead of or in addition to processing done at the devices. Further, when the terms "from" or "to" are used, in addition to direct communication, such terms can cover situations where intermediaries are involved or work in conjunction with (e.g., cooperate with) the devices. For example, when a communication is received "from" a device, such communication may pass through a server.

Still further, redundancy can be supported in that communications can take place without involvement of a server (e.g., in a peer-to-peer scenario), with involvement of server, or both. During a single communication, the scenario can change, depending on a variety of factors, such as network conditions, signal strength, bandwidth, and the like.

Example 29—Video Calling Service

In any of the examples herein, a video calling service can support video calls between participants in the service. In practice, the video calling service can be a service that also supports other (e.g., voice, VoIP, or the like) call types, whether provided over a PSTN or non-PSTN network.

Example 30—Exemplary User Identifiers

In any of the examples herein, a user identifier can be used to identify a user (e.g., independent of a service). For example, a name, phone number, device identifier, network address, email address, username, or other indicia of the user can be used.

In any of the examples herein, a service user identifier can be used to identify a user or subscriber to a service (e.g., video call service or the like). Such identifiers can take a variety of forms and can include names, phone numbers, device identifiers, network addresses, email addresses, usernames for the service, or other indicia of the user.

Mappings between such identifiers can be used as described herein to determine whether a particular user is a subscriber to a particular service.

Example 31—Exemplary Invitation

In any of the examples herein, an invitation to escalate a call can take the form of an incoming video call notification. As described herein, additional information can be included in the notification to distinguish it as an invitation to escalate rather than an ordinary incoming video call. Other forms of invitations can be supported to communicate a request to escalate a call.

Example 32—Exemplary Video Call Context Information

Figure 14:
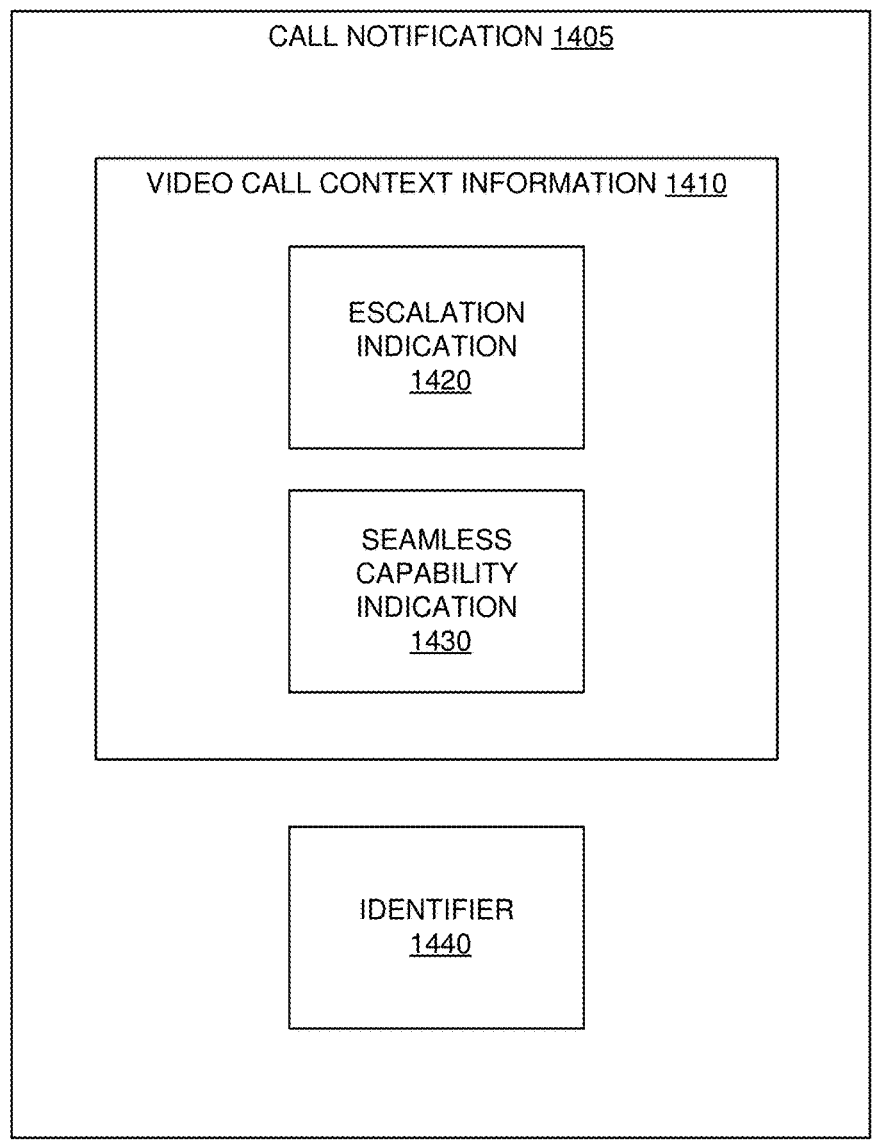
FIG. 14 is a block diagram of an exemplary data structure storing video call context information, including an escalation indication.

FIG. 14 is a block diagram of an exemplary data structure 1400 storing video call context information 1410, including an escalation indication 1420. The video call context information 1410 can be sent by an originating device or a server to act as a notification of an escalation request. In practice, the information 1410 can be included as part of an incoming video call. The video call context information 1410 can be used to denote an incoming call as a special call that is to be treated as part of seamless transition as described herein.

As shown, an escalation indication 1420 can indicate that the incoming video call is a result of an escalation request, thereby differentiating it from an ordinary incoming video call. Contextual information can thus be gleaned from the indication 1420. For example, it can be concluded that the notified device receiving the notification is already in an audio-only call with the originating device. The information 1410 can also indicate the type of call that is already in progress (e.g., audio only, video, or the like), allowing for multiple stage escalation if desired.

An identifier 1440 can be associated with the call notification 1405 to indicate a user identifier or call identifier associated with the incoming call. Alternatively, the identifier 1440 can be included with the call context information 1410.

Other indications can be included as part of the context information 1410. For example, a seamless capability indication 1430 can be included to indicate whether a seamless escalation of the call is possible (e.g., whether the originating device, the recipient device, or both are capable of implementing a seamless call transition to a video call).

As described herein, the escalation indication 1420 can serve a variety of purposes by indicating the context of the video call. For example, it can serve as a flag that the call is an escalation, and other actions can be taken based on whether the indication 1420 does indicate that the call is an escalation of an audio-only call.

In practice, in a communication device that comprises a call controller operable to conduct a public switched audio-only call, an incoming video call processor can be operable to receive the call notification 1405 and determine that the incoming video call is an escalation of the audio-only call via inspection of the call notification and seamlessly transition from the audio-only call to the video call, based on the presence of the indication. The call controller can then end the audio-only call (e.g., without providing an explicit indication that the audio-only call has ended).

Receipt of the call notification 1405 can cause the receiving device to engage in seamless escalation of an audio-only call based on inspection of the video call context information 1410 stored in the call notification 1405. The escalation indication 1420 can cause a context engine to indicate that the incoming video call is an escalation of the current audio-only call. Escalation can then be orchestrated as described herein.

In addition, a recipient can provide status information that can be used to build call context information and decide how or whether to engage in call escalation. For example, a recipient can provide such information as whether the endpoint is logged in, whether a data connection is present, whether the current connection would support high quality video calls, whether escalations are desired, or the like. Such information can be published to the originator, server, or both in advance of the escalation to avoid or enhance escalation processing.

Example 33—Exemplary Video Call Context Processing Method

Figure 15:
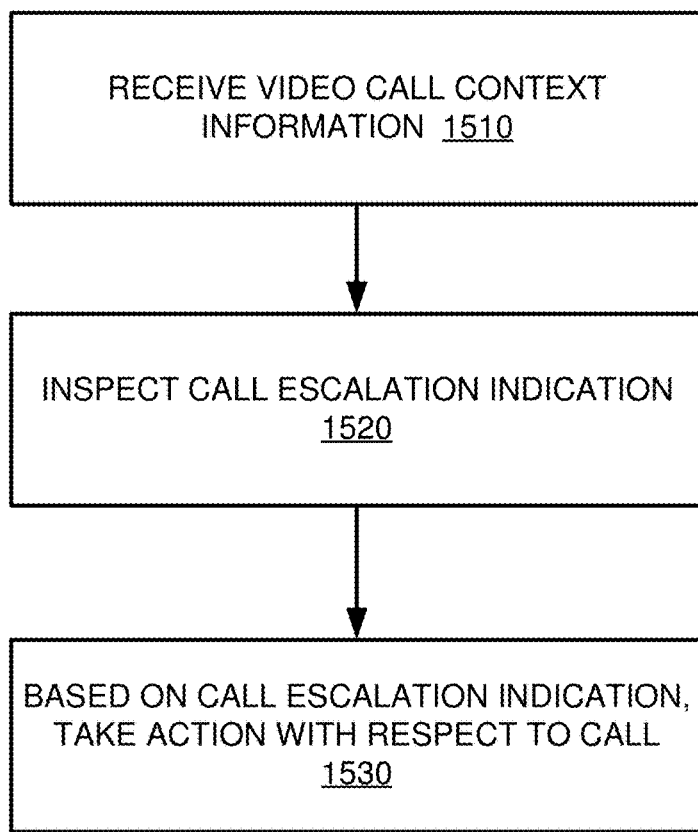
FIG. 15 is a flow chart of an exemplary method of processing video call context information in a call escalation scenario.

FIG. 15 is a flow chart of an exemplary method 1500 of processing video call context information in a call escalation scenario and can be used in any of the examples herein in conjunction with video call context information to improve escalation processing. The method 1500 can be performed during an audio-only call (e.g., while a device is engaged in an audio-only call with an originating device), which is subsequently escalated to a video call under certain circumstances as described herein.

At 1510, video call context information is received. For example, the video call context information 1410 or similar information can be received. As described, the video call context information can include an indication of whether the video call is an escalation of a voice-only call. Such information can be received as part of an incoming video call notification (e.g., from the originating device).

At 1520, the video call context information is inspected. For example, it can be determined whether or not an incoming call is an escalation of a voice-only call by inspecting the call escalation indication. Although a flag can be used, richer context can be supported indicating the type of escalation or the like. Whether seamless escalation is supported can also be determined. Depending on implementation, if the call escalation indication indicates that the incoming call is an escalation, it can be assumed that the incoming video call is an escalation of the current call, or explicit information linking the current audio-only call to the incoming video call can be used (e.g., a user identifier, call identifier, or the like). If such information is included, it can be inspected to verify that the incoming video call originates from the same user or call currently in progress.

At 1530, responsive to determining that the video call context information indicates that the incoming video call is an escalation of the audio-only call, an action is taken with respect to the incoming video call.

Thus, the video call context information can be acted on by the recipient, server, or both to affect processing of an incoming call to treat it differently than a regular (e.g., new video) call. A variety of actions are supported if the call is indicated as an escalation. For example, the pinpoint escalation described herein can be invoked responsive to a server's detection that the call is an escalation of a voice-only call.

Rather than treating the call as a new video call, a seamless escalation as described herein can be implemented. For example, seamless escalation of the audio-only call to the incoming video call can be orchestrated as described herein. Thus, the video call can be presented as a continuation of the audio-only call. For example, the audio-only call can be ended without explicitly indicating that the audio-only call has ended (e.g., no "ended" message is presented for the audio-only call). However, an indication of whether seamless escalation is possible can also be inspected. If not, escalation and other features can still be implemented (e.g., by explicitly ending the current audio-only call and escalating to the video call).

For example, some devices (e.g., CDMA or the like) are not able to simultaneously engage in voice-only and video calls. Therefore, the action taken can be to check capabilities of the device and then escalate the call accordingly.

Ordinarily, a current call ends when another call is picked up; however, in the case of a seamless escalation, call-ending processing can be handled differently. For example, responsive to detecting the escalation indication indicates escalation, the audio-only call is not shown as ending, even though the call is eventually ended.

In the case of an escalation, a user interface option can be presented by which the invited user can decline (e.g., escalation is at the user's option rather than automatic). The recipient device can display an indication that an escalation request has been received (e.g., "<Name> is requesting to upgrade the call to video"). Responsive to activation of the user interface (e.g., a graphical pushbutton that displays "add video to the call") option, escalation can continue (or be prevented).

In some cases, an auto-answer functionality may be active. However, in the case where the incoming call is an escalation, such auto-answer functionality may not be desired. So, responsive to detecting the escalation indication, the action taken can be that auto-answer functionality can be inhibited (e.g., the incoming video call is not answered, even though auto-answer functionality is active).

Other actions can be taken based on detection of the escalation indication as desired. For example, a context for the incoming call can be generated, and such generation can include consulting the escalation indication, the seamless call transition indication capability, or any other information available as part of the video call notification or otherwise. The escalation indication can provide a richer call context that allows call handling decisions to be made in a more intelligent way. For example, if a call notification indicating escalation is received at a device that is unable to implement escalation (e.g., no audio call is currently in progress, video functionality is not available, or the like), the call notification can be ignored, an error message can be presented, or the like.

If the call context indicates that a seamless escalation is not possible, the action can comprise orchestrating a transition from the audio-only call to the video call, regardless of whether the transition is seamless.

Example 34—Exemplary Shared Services Participation

In any of the examples herein, participation in shared services by a contact can be determined and noted locally in a communication device. For example, if a contact is able to connect to a service that is supported locally (e.g., the two users subscribe to or are able to participate in a same service), a notation can be made in the local address book or otherwise. For example, in the case of video calling service, it can be determined whether contacts in a local address book support the video calling service (e.g., the supporting application is installed, a subscription is current, or the like).

As described herein, participation by other parties can be confirmed before a call is escalated. In this way, during the audio-only call, it is possible to quickly determine whether the call escalation (e.g., to the supported service) is possible. In some cases, such a process is called "short circuit" because the usual process of registering a contact as one that is supported via a back-and-forth exchange can be avoided. Instead, the contact simply appears as able to participate in the shared service.

Example 35—Exemplary Pre-Escalation Contact Participation Confirmation System

Figure 16:
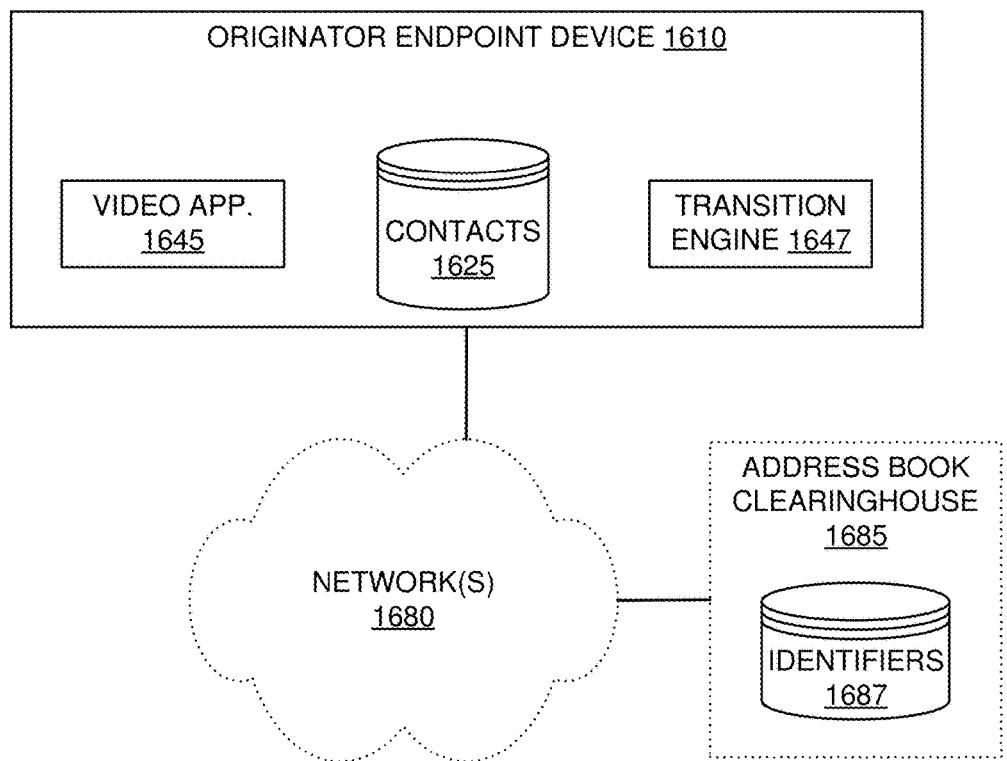
FIG. 16 is a block diagram of an exemplary system implementing pre-escalation contact participation confirmation.

FIG. 16 is a block diagram of an exemplary system 1600 implementing pre-escalation contact participation confirmation and can be used in any of the examples herein.

In the example, an originator endpoint device 1610 stores contacts 1625 (e.g., sometimes called an "address book") for a plurality of contacts and associated information locally at the device 1610. In practice, the contacts 1625 can be mirrored or otherwise synchronized to information stored in the cloud (e.g., via networks 1680). The contacts 1625 can be considered to be stored locally from the perspective of the device 1610.

In the example, the device 1610 also includes a video application 1645 that supports video calls and a transition engine 1647 that can orchestrate transition between audio-only and video calls.

The device 1610 can connect to (e.g., be in communication with, query or the like) an address book clearinghouse 1685 that stores identifiers 1687 of those users participating in a service that is supported by the device 1610. For example, a video calling service can be available that operates in conjunction with the video application 1645. The video service identifiers 1687 can be any of the video service identifiers described herein or the like to identify the users of the service. The presence of an identifier 1687 or other indication can be used to confirm participation of a user or device in the service. The clearinghouse 1685 can be an integrated into an application service (e.g., the service 385 of FIG. 3, which can provide a video calling service or the like) or be a separate service.

Although shown as remote from the endpoint device 1610, in practice, the address book clearinghouse 1685 can be implemented locally, by which lookups can be performed locally. For example, contacts in the global address book can be checked against a locally-stored address book that is specific to a video service application, which functions as the clearinghouse.

The address book clearinghouse can be configured to provide a video service identifier for the video calling service responsive to receiving a user identifier of a contact. For example, a phone number or email address can be received by the address book clearinghouse 1685, and the clearinghouse 1685 can provide an indication of whether the phone number or email address is related to a user who participates in the service and/or whether the associated device supports the service.

The device 1610 can be configured to periodically communicate information about a particular contact out of the stored contacts 1625 as described herein to the address book clearinghouse 1685 and receive in response a confirmation that the contact is a participant in the video calling service.

In practice, security and optimization techniques can be used when exchanging information between the device 1610 and the clearinghouse 1685 to preserve privacy, increase performance, and the like.

In a call escalation scenario, presentation of an option to escalate an audio-only call to a video call can be limited to those contacts 1625 that are indicated as participating in the service by the address book clearinghouse 1685 according to the identifiers 1687. Such information can also be obtained in other ways (e.g., via direct invites between devices, invites passing through a server, or the like).

As described herein, the contacts 1625 can be updated in advance of escalation via consultation of the clearinghouse 1687 (e.g., before the call is initiated). For example, the contacts 1625 can be updated during idle time or the like.

The endpoint device 1610 can be configured to bypass a confirmation user interface for a participating contact during call escalation to a video call via the video calling service.

Example 36—Exemplary Pre-escalation Contact Participation Confirmation Method

Figure 17:
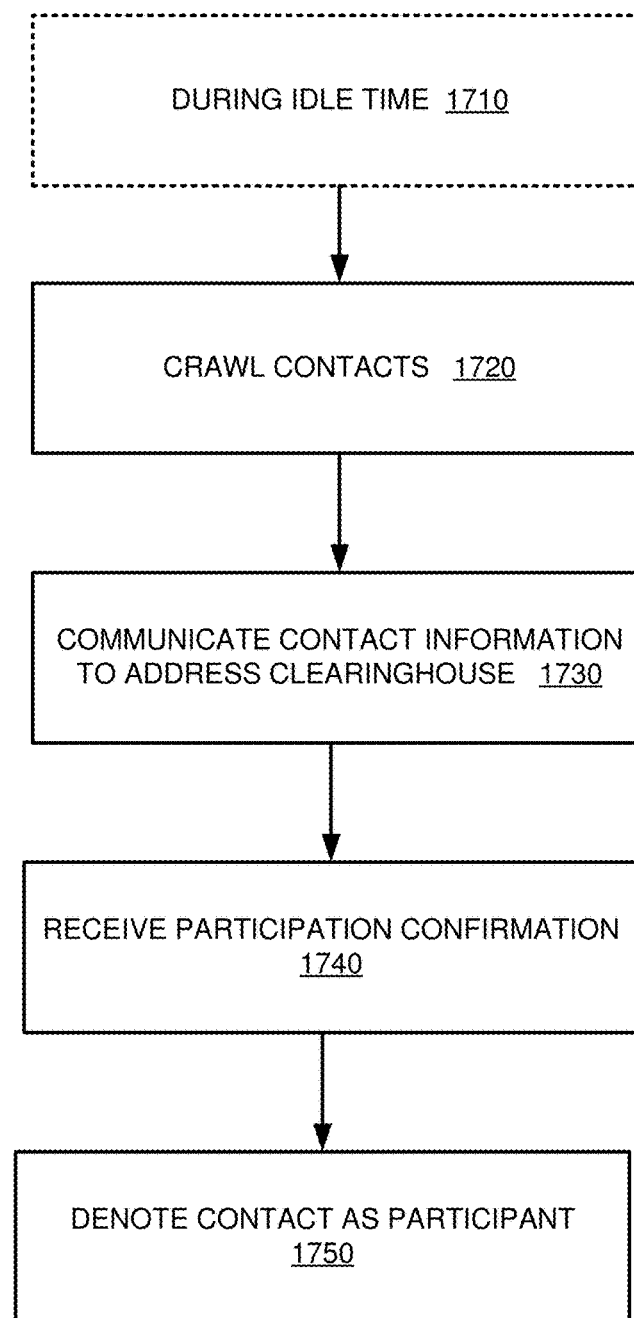
FIG. 17 is a flow chart of an exemplary method of implementing pre-escalation contact participation confirmation.
Figure 18:
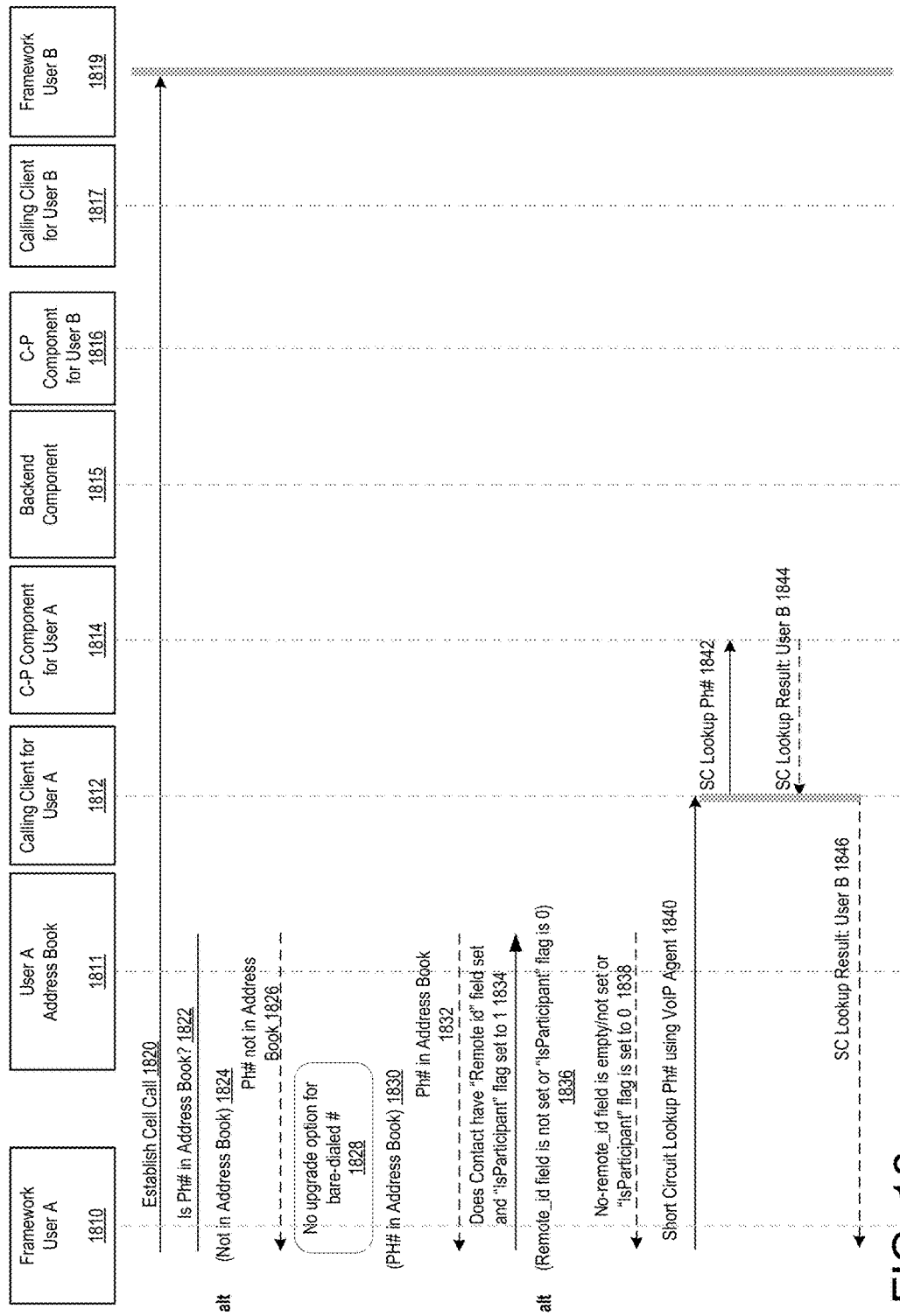
FIGS. 18, 19, 20, and 21 are a flow diagram showing call processing for an implementation of the technologies, including seamless escalation of an audio-only call to a video call.
Figure 19:
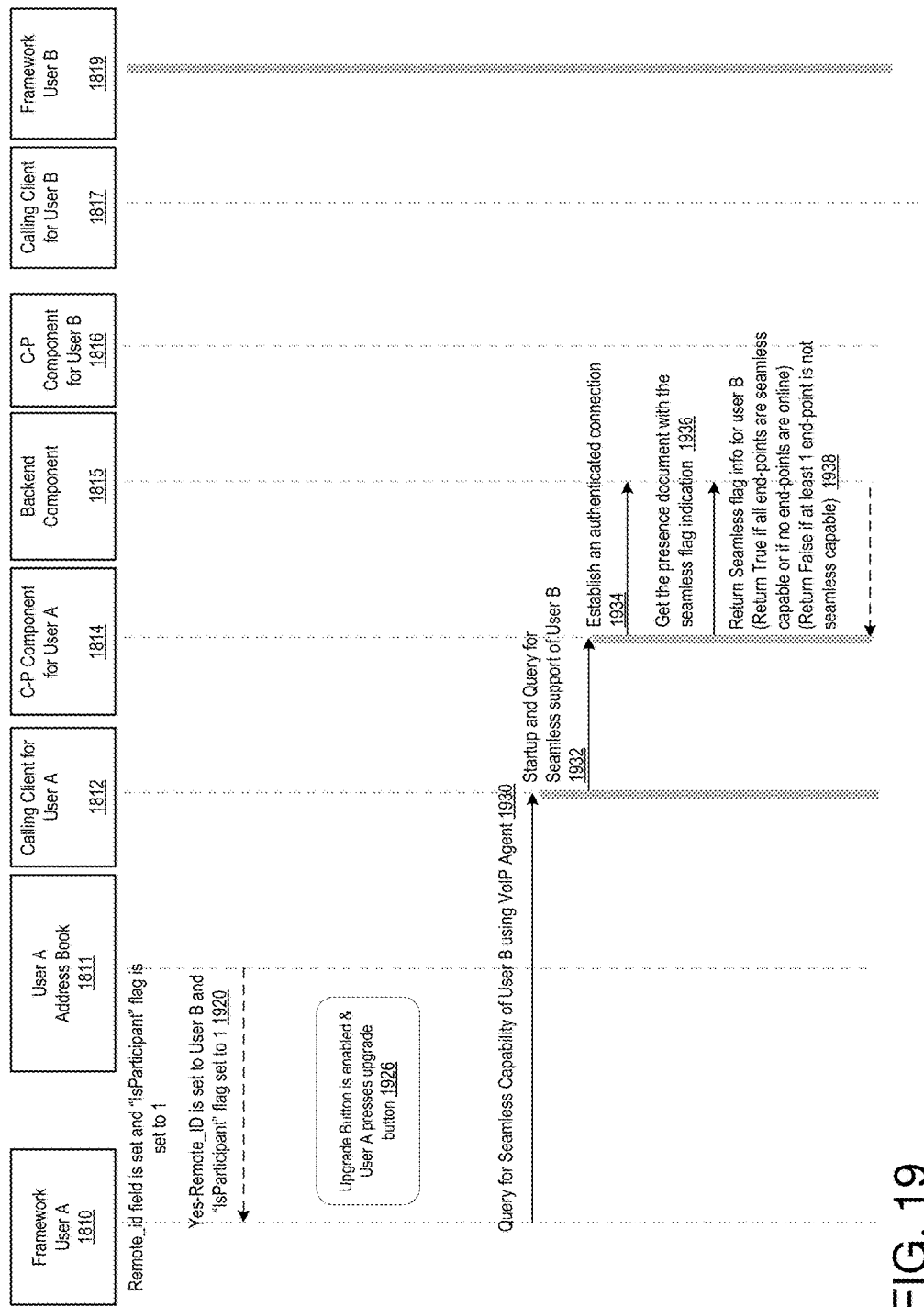
Figure 20:
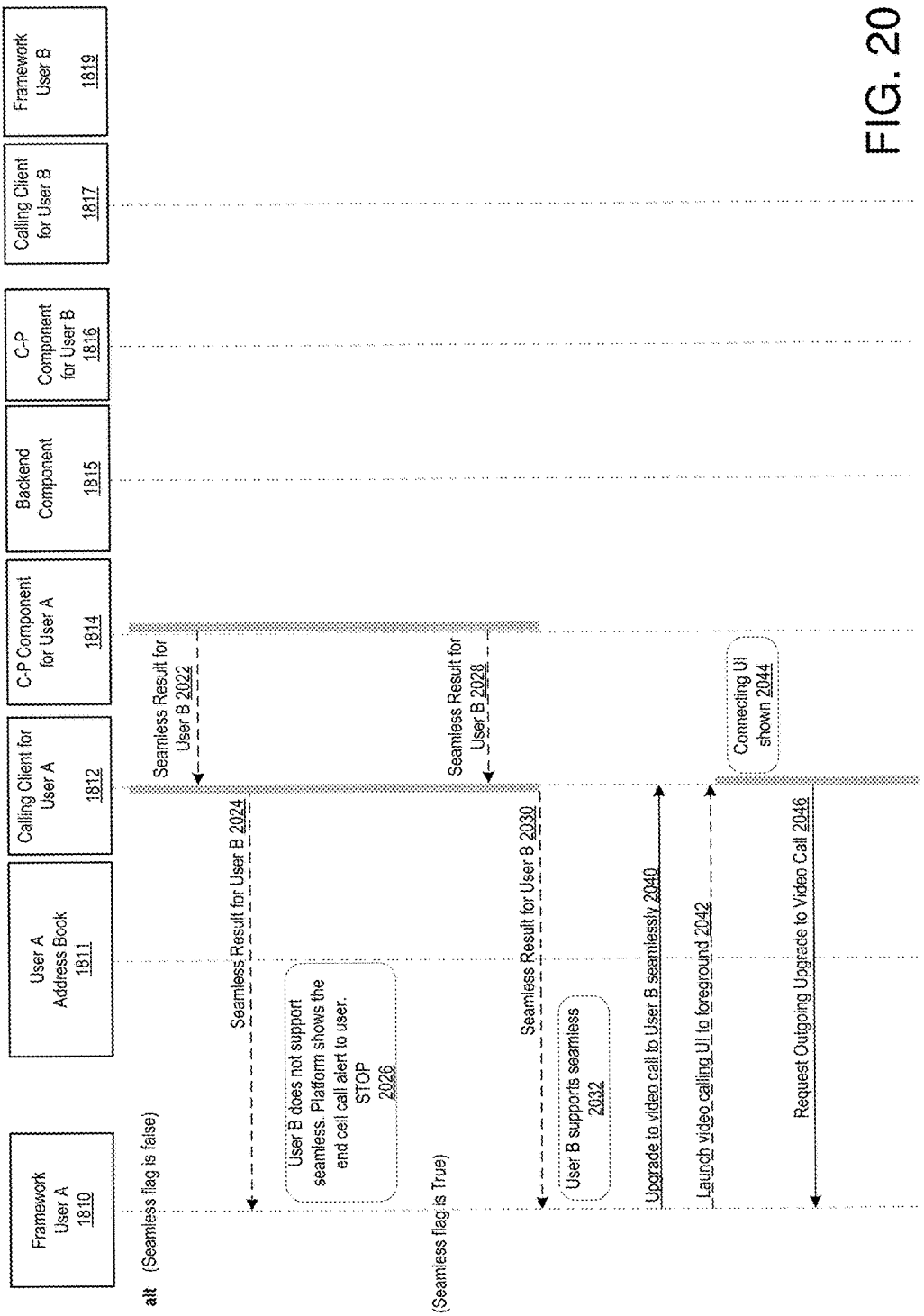
Figure 21:
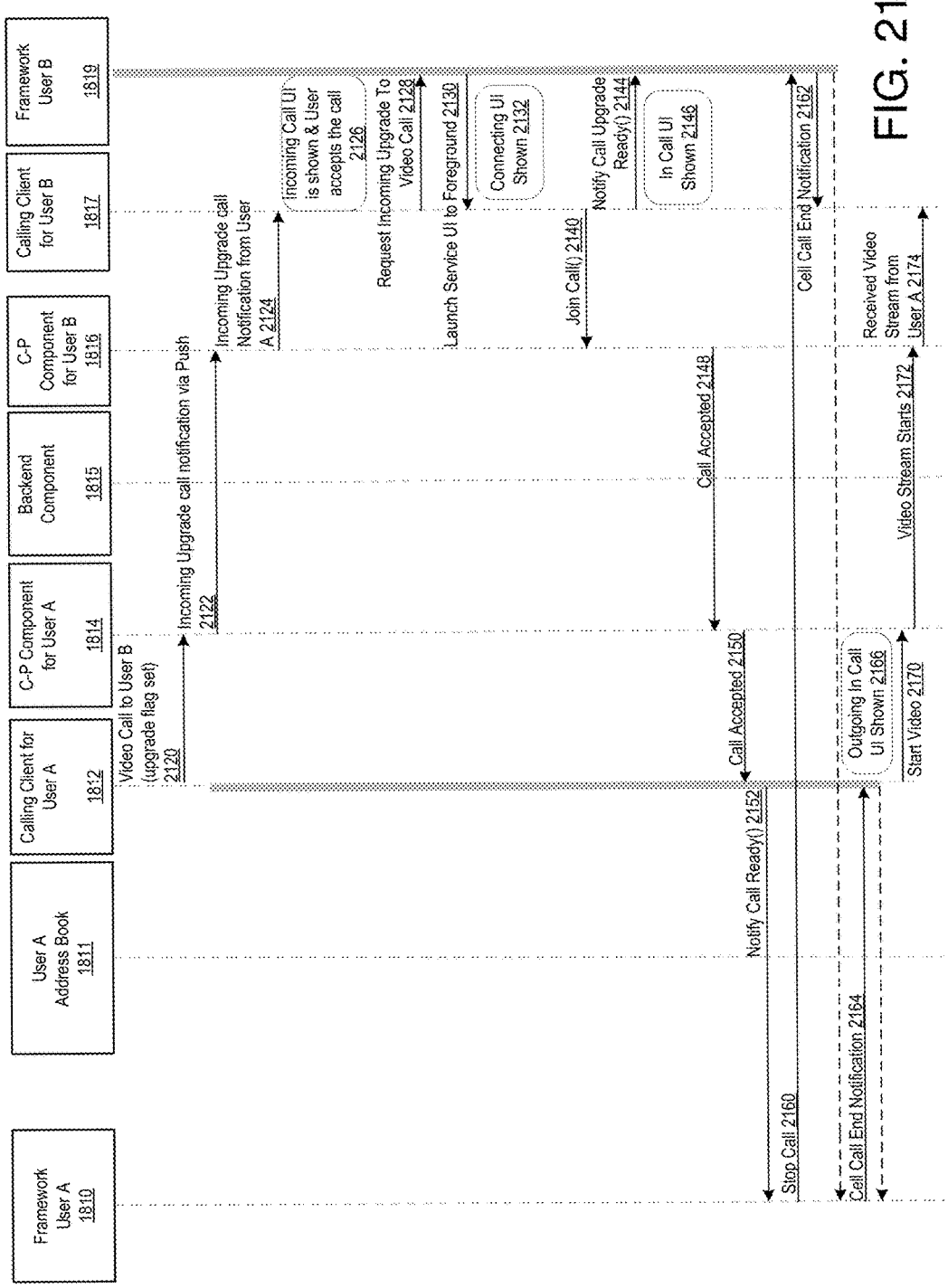

FIG. 17 is a flow chart of an exemplary method 1700 of implementing pre-escalation contact participation confirmation and can be used in any of the examples herein in conjunction with a contacts address book to improve escalation processing.

As described herein, the method 1700 can be performed during idle time 1710. So, determination that the communication device is idle can be made, and responsive to such determination, the method can be performed. For example the method can be performed when no calls are being made, when the data connection is idle, or at any other time before the call to a contact is escalated or initiated. Subsequently, an option for escalating the call can be presented as described herein.

In practice, waiting until call initiation to perform the method can result in some escalation delay, but such a technique may still be desirable in some cases. The method 1700 can be scheduled for periodic execution so that the address book information tends to be current.

At 1720, the contacts (e.g., the local address book) are crawled. For example, the contacts can be examined seriatim or according to some priority (e.g., looking at recently added contacts first or the like). Information identifying the contact (e.g., phone number, email address, user name, or the like) can be determined as an identifier for a contact. For the plurality of contacts stored at the communication device, contact information for the contacts can be read.

At 1730, the contact information (e.g., user identifier or the like) can be communicated to an address clearinghouse. For example, the identifier can be sent to the clearinghouse as part of a query concerning whether the identifier is a participant in a particular service (e.g., video call service). Information can be encrypted, hashed or otherwise obfuscated to preserve privacy. In practice, a phone number or email address can be used for the user identifier and sent to the address clearinghouse for a contact.

At 1740, if the contact is a participant in the service, participation confirmation is received for the participating contact. For example, a positive indication or an indication of a user identifier (e.g., of the video calling service for the contact) that can be used to connect to the user or device can be received. In the case that the contact is not a participant, no answer or a negative response can be provided. From the clearinghouse perspective, such information is sent as a result of determining whether the user associated with the incoming query is a participant in the service. Service connection information (e.g., sufficient to start a video call) can also be provided.

At 1750, responsive to receiving confirmation that the contact is associated with a participant of the service, the contact is denoted as a participant (e.g., in the address book). For example, the contacts information can be updated to indicate that the contact is a participant. An indication can be locally stored that indicates that the participating contact is a participant in the service. Service connection information such as a username, identifier, network address, or the like can also be stored.

Locally storing such an indication can include creating an entity record for the contact accessible by an application at the communication device that implements the video calling service. Information sufficient to start a video call to the participating contact (e.g., a user identifier of the participating contact for the video calling service) with the video calling service can be placed in the entity record.

Subsequently, when in calls with the confirmed participant, the option to escalate the call can be presented responsive to determining that the contact is a participant (e.g., responsive to the stored indication) as described herein. For example, during an audio-only call with the participating contact, an option can be presented to escalate the audio-only call to a video call via the service. The obtained connection information, if any, can be used to escalate the call. For those contacts that are not participants, the option can be omitted or inhibited (e.g., not presented, greyed out, or the like)

Because the contact is denoted as a participant in the video calling service, the usual confirmation user interface can be bypassed due to confirmation. For example, instead of presenting a confirmation dialog by which a user can confirm that the contact should be updated to indicate that the contact participates in the service, the dialog can be bypassed. If desired, a user preference can be maintained. Thus, a user indication that the confirmation user interface is to be bypassed for contacts having information stored at the communication device can be received.

Such an arrangement can be helpful because it can be assumed that contacts appearing in the local address book should be authorized to communicate via the device by virtue of the fact that their information appears in the local address book.

Example 37—Exemplary Confirmation User Interface

In any of the examples herein, a confirmation user interface can be presented for participants in a video calling service. For example, such a user interface can be presented as a technique for integrating users into the video calling service so that they are recognized by the video calling application at the device (e.g., they are available for video calls).

For example, such a user interface can be presented as part of adding a user to the address book or a service-specific address book. The user interface can ordinarily function as a prerequisite for making or receiving video calls to a contact.

As described herein, such a confirmation user interface can be bypassed under certain conditions.

Example 38—Exemplary Address Book

In any of the examples herein, the address book can be a global address book for a communication device. Such an address book can be maintained by the operating system or other orchestrating entity that allows access for public switch telephone network calls, emails, text messages, video calls, and the like.

In practice, such an address book can be an aggregation of information from a variety of sources (e.g., social media, phone calls, emails, text messages, and the like). Thus, the address book can be used for a proxy to determine whether there is a relationship with a contact (e.g., whether they are connected in a social graph). It can be assumed that those users appearing in the address book are contacts with which the user wishes to engage in communication. A user preference can be provided to limit such an assumption if desired.

Example 39—Exemplary Incoming Escalation Configuration

In any of the examples herein, a user setting can be provided by which a user can indicate whether call escalations are desired to be implemented (e.g., sent or received), or under which conditions they are desired to be implemented. For example, a user may decide that escalations are desired only when connected to WiFi, only at certain devices, or the like.

Such a user setting (e.g., "Allow escalation," "Allow video add invitations," "Allow incoming video add only when connected to Wi-Fi," or the like) can be controlled via presentation of a user interface giving options for selection by the user. Receipt of the selected option can then be implemented at the device (e.g., by not presenting the option at an originating device, rejecting invitations at a recipient device, indicating that the recipient device will not accept invitations in the first place, or the like).

Example 40—Exemplary Audio-Only Call

In any of the examples herein, an audio-only call can comprise a public switched telephone network (e.g., audio-only) call (e.g., a cellular phone call, circuit switched phone call, or the like). Thus, such a call can be escalated to a video call as described herein. Such a video call can be supported by a video calling service that uses non-PSTN networks (e.g., VoIP or the like). Thus, a superior user experience can be provided within the familiar context of a public switched telephone network call.

Example 41—Exemplary Call Escalation Implementation

FIGS. 18, 19, 20, and 21 are a flow diagram showing call processing for an implementation of the technologies by which call escalation is implemented. In the example, a phone operating system framework 1810 at a first device associated with a first user, a global address book 1811 for the first device, a platform-specific calling application client component 1812, and a cross-platform client component 1814 communicate with a backend (e.g., server) component 1815 that is in communication with the cross-platform client component 1816 at a second device associated with a second user, a platform-specific calling application client component 1817, and the phone operating system framework 1819 at a second device.

The phone operating system (e.g., platform) can be different on the different devices to support cross-platform communications. The calling application can support video calling as described herein, and the backend component 1815 can be part of a video calling service as described herein. Although the operating system can take the form of the Windows Phone operating system of Microsoft Corporation; the iOS operating system of Apple Incorporated; the Android operating system of Google Inc. and others; or the like, the technologies can be applied across a wide variety of platforms. A wide variety of calling applications, such as the Skype™ application provided by Microsoft Corporation, the Viber application provided by Viber Media Inc., the Tango™ application provided by TangoME, Inc., and others can be supported. In the case of a Windows Phone implementation, the address book 1811 can take the form of the People Hub, but analogous implementations are possible on other platforms. Similarly, in a Skype™ implementation, the cross-platform client component 1814, 1816 can take the form of the CoreLib system.

The flow diagram shows communications in an exemplary call escalation scenario. At 1820, a cell call (e.g., an audio-only call over a public switched telephone network) is established. At 1822, it is determined whether the phone number of the other party (e.g., the recipient in the example) is in the global address book of the local device (e.g., the originator in the example). At 1826, if not, there is no escalation option for a bare-dialed number that is not in the address book 1828. Such an approach can be taken on the assumption that a user typically would not prefer to have an option to escalate a call with a bare number. However, in practice, such an option can be provided (e.g., if desired, if preferences are so set, or the like).

It is then determined whether the recipient is shown as a participant in the video calling service in the global address book. At 1832, if the phone number is in the address book, the contact is checked in the global address book to see whether a IsParticipant flag is set and whether a remote user identifier field is set 1834 for the contact.

If either of the fields are not set 1838, the service user name of the recipient is then obtained from the client application. At 1840, the telephone number of the recipient is used to look up the service user name of the recipient via a VoIP agent. As shown, the processing 1842, 1844 can include invoking a cross-platform client component 1814. The result is then provided 1846.

If both the fields are set 1920 in the address book, the escalate button is enabled as described herein; an indication of activation of the button can then be received 1926. The remote user identifier field and IsParticipant flag can be set as described herein via pre-escalation participation confirmation techniques.

It is then determined whether seamless escalation is possible 1930. A query for seamless call escalation capability 1932 can be relayed by the cross-platform component by establishing an authenticated connection 1934 on behalf of the user via the local user name (e.g., using a token or other technique) with the backend component 1815.

The mobile presence information can then be obtained (e.g., via an instant messaging or other communication protocol) (e.g., the Mobile Status Notification Protocol or the like) 1936. The seamless call escalation flag information for the recipient user can be returned at 1938.

If the seamless call escalation flag indicates that seamless call escalation is not possible 2022, the result is relayed 2024 back to the framework. At this point, various actions can be taken 2026, such as ending the call, displaying an error message, or engaging in call escalation, even if it is not seamless.

If the seamless call escalation flag indicates that seamless call escalation is possible 2028, the result is relayed 2030 back to the framework. It is determined that the recipient supports seamless call escalation 2032, and the process continues.

The process of escalating the audio-only call to video is then initiated 2040. The video calling client user interface is launched to the foreground 2042. A connecting user interface can be shown 2044. A notification that a request for an outgoing upgrade to video call is taking place can be sent 2046 back to the framework 1810.

The video call can then be made 2120. The call context information for the outgoing call can be set to indicate that the video call is an escalation of an audio-only call (e.g., via an upgrade flag or other indication of escalation as described herein). A push notification can be sent 2122 to the cross-platform component 1816 on the second device (e.g., directly, through the backend component 1815, or the like). A notification of an incoming video call is received at 2124; the notification can indicate that it is for an escalation of a call.

At 2126, the escalation call user interface is shown, and the user can accept the call. A request can be sent to the framework 2128. The video calling client user interface can be launched to the foreground at 2130. A connecting user interface can be shown at 2132. A join call message can be sent 2140. A notification that the system is ready to escalate the call can be sent 2144. Subsequently, the in-call user interface can be shown 2146.

At 2148, the call is accepted. At 2150, the acceptance is relayed. A notification that the call is ready can be sent at 2152.

A stop call message (e.g., to stop the audio call) can be sent 2160. The cell call end notification 2162 is then sent back, which results in a cell call end notification 2164 from the originating device.

The outgoing in-call user interface can be shown 2166, a start video message can be sent at 2170, and relayed at 2172. Finally, the received video stream from the first user is received 2174.

The call has been escalated, and communication between the two endpoints can continue.

Figure 22:
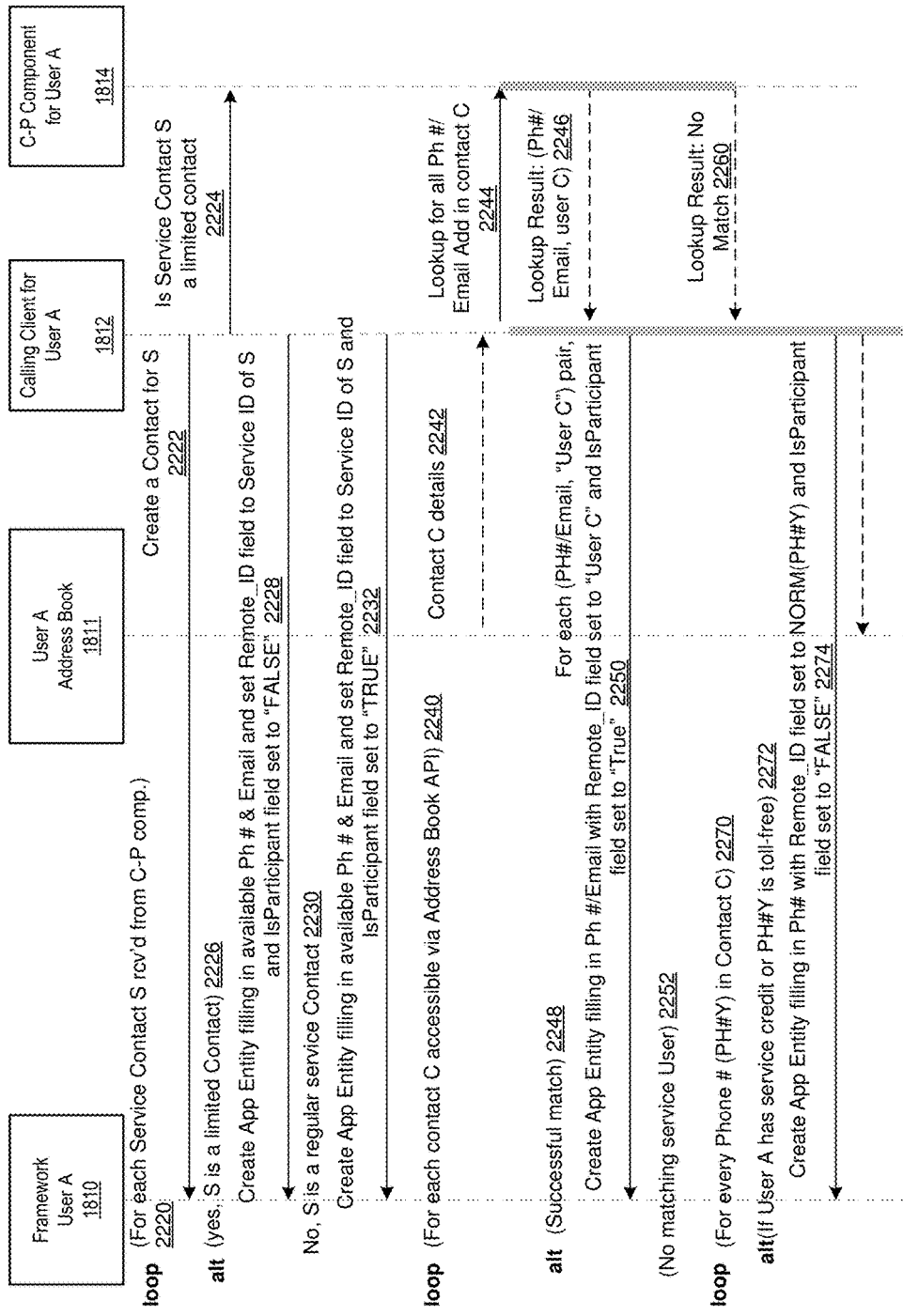
FIG. 22 is a flow diagram showing processing for an implementation of the technologies, including pre-escalation participation confirmation.

Example 42—Exemplary Implementation with Pre-Escalation Participation Confirmation FIG. 22 is a flow diagram showing exemplary processing for an implementation of the technologies, including pre-escalation participation confirmation. The elements involved can be similar to those for FIG. 18. As shown, the process can be limited to execution on a single device (e.g., it can be performed on the originating device, a recipient device, or both). In some cases, a server component can be involved.

As described herein, a client application can provide communications for a service, such as a video service.

One embodiment creates an application entity in a local global address book for those service contacts S received 2220 from a cross-platform calling client 1812. A contact is created for S 2222. It is determined whether the service contact S is a limited contact 2224 (e.g., a contact that is not an actual full participant in the service, but can be reached thereby). If so, 2226, an application entity is created 2228, and the phone number and email fields are filled in. The remote identifier field is set to the service user identifier of S. However, the IsParticipant field (e.g., flag) is set to false because the contact cannot be reached via the video calling service.

If the contact is a regular service contact 2230, then an application entity is created, and the phone number and email fields are filled in. The remote identifier field is set to the service user identifier of S, and the IsParticipant field is set to true 2232. The flag can be used subsequently as part of call escalation processing.

In another embodiment, as described herein, a local global address book can be crawled to find contact information. As described herein, such a method can be performed at idle time. For those contacts accessible 2240 via an API for accessing the global address book (e.g., DirectAccess or the like), the details are sent 2242 to the service application. A lookup for the phone number, email, or service user name 2244 can take place, with the result provided 2246. Such a technique is sometimes called "short circuit" as described herein.

If there is a successful match 2248, for the phone number/ email, user name pair, an application entity is created, the information is filled in, and the IsParticipant field is set to true 2250.

If there is no match 2252 (e.g., the contact is not a participant in the video calling service) based on the result 2260, further processing can take place.

For the available phone numbers for the contact 2270, if the originating user has service credit or the phone number is toll free 2272, an application entity can be filled in, the service user name can be set to the normal phone number, and the IsParticipant field can be set to false 2274.

As described herein, the IsParticipant field can then be consulted to determine whether the other party in an audio-only call is a participant in the service (e.g., from the perspective of the originating party). Thus, pre-escalation participation confirmation is achieved. The other party may actually be a participant in the service, but for purposes of escalation processing, the other party is treated as unavailable for call escalation. Thus, the IsParticipant field can indicate whether the contact is a participant in the local user's network of users who can access the service.

Example 43—Exemplary Computing Systems

Figure 23:
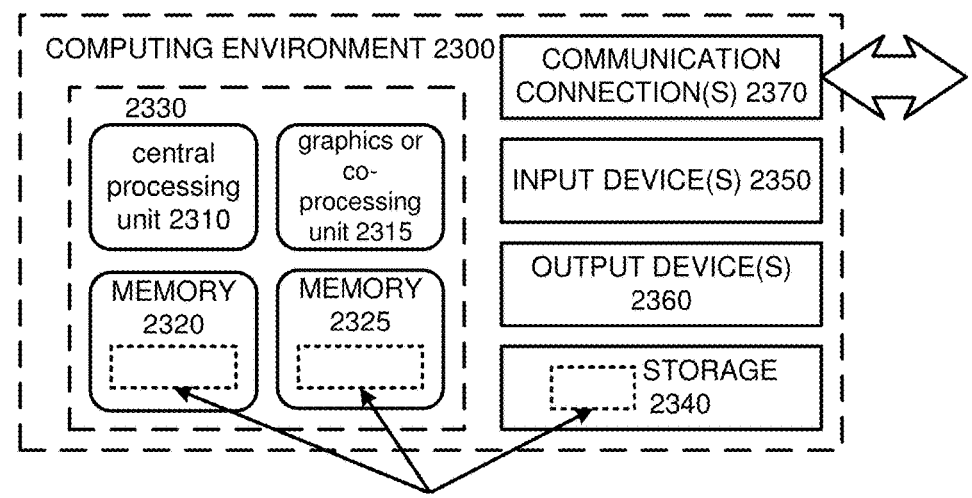
FIG. 23 is a diagram of an exemplary computing system in which some described embodiments can be implemented.

FIG. 23 illustrates a generalized example of a suitable computing system or environment 2300 in which several of the described innovations may be implemented. The computing system 2300 is not intended to suggest any limitation as to scope of use or functionality, as the innovations may be implemented in diverse general-purpose or special-purpose computing systems. A communication device as described herein can take the form of the described computing system 2300.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s). The memory 2320, 2325 stores software 2380 implementing one or more innovations described herein, in the form of computer-executable instructions suitable for execution by the processing unit(s).

A computing system may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. For video encoding, the input device(s) 2350 may be a camera, video card, TV tuner card, or similar device that accepts video input in analog or digital form, or a CD-ROM or CD-RW that reads video samples into the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 2300, computer-readable media include memory 2320, 2325, storage 2340, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 44—Exemplary Mobile Device

Figure 24:
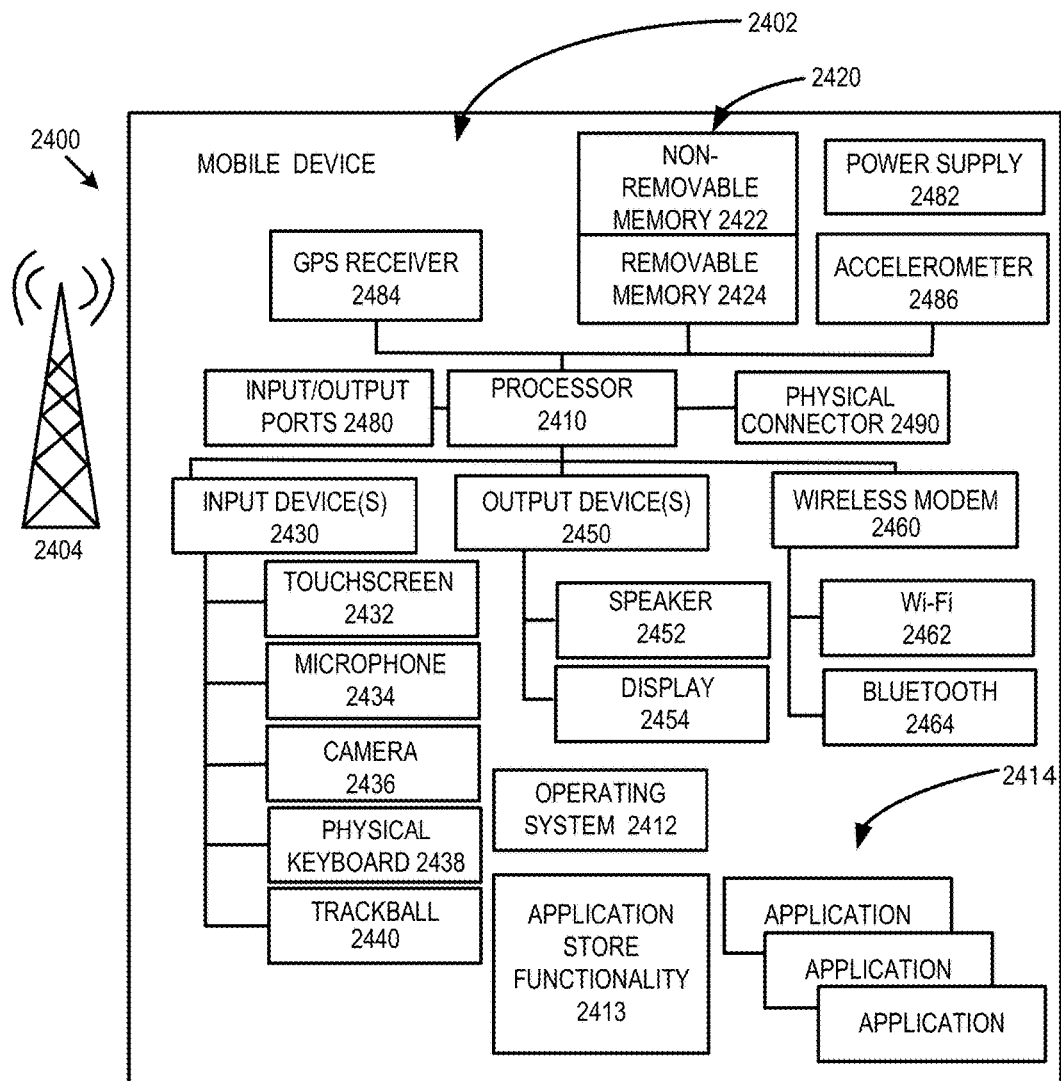
FIG. 24 is an exemplary mobile device that can be used for the technologies described herein.

In any of the examples herein, a communication device can take the form of a mobile device. FIG. 24 is a system diagram depicting an exemplary mobile device 2400 including a variety of optional hardware and software components, shown generally at 2402. Any components 2402 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 2404, such as a cellular, satellite, or other network. Voice over IP scenarios (e.g., over WiFi or other network) can also be supported. The communication devices described herein can take the form of the described mobile device 2400.

The illustrated mobile device 2400 can include a controller or processor 2410 (e.g., signal processor, microprocessor, ASIC, or other control and processing logic circuitry) for performing such tasks as signal coding, data processing, input/output processing, power control, and/or other functions. An operating system 2412 can control the allocation and usage of the components 2402 and support for one or more application programs 2414. The application programs 2414 can include common mobile computing applications (e.g., email applications, calendars, contact managers, web browsers, messaging applications), or any other computing application. Functionality 2413 for accessing an application store can also be used for acquiring and updating applications 2414.

The illustrated mobile device 2400 can include memory 2420. Memory 2420 can include non-removable memory 2422 and/or removable memory 2424. The non-removable memory 2422 can include RAM, ROM, flash memory, a hard disk, or other well-known memory storage technologies. The removable memory 2424 can include flash memory or a Subscriber Identity Module (SIM) card, which is well known in GSM communication systems, or other well-known memory storage technologies, such as "smart cards." The memory 2420 can be used for storing data and/or code for running the operating system 2412 and the applications 2414. Example data can include web pages, text, images, sound files, video data, or other data sets to be sent to and/or received from one or more network servers or other devices via one or more wired or wireless networks. The memory 2420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 2400 can support one or more input devices 2430, such as a touch screen 2432, microphone 2434, camera 2436, physical keyboard 2438 and/or trackball 2440 and one or more output devices 2450, such as a speaker 2452 and a display 2454. Other possible output devices (not shown) can include piezoelectric or other haptic output devices. Some devices can serve more than one input/output function. For example, touchscreen 2432 and display 2454 can be combined in a single input/output device.

A wireless modem 2460 can be coupled to an antenna (not shown) and can support two-way communications between the processor 2410 and external devices, as is well understood in the art. The modem 2460 is shown generically and can include a cellular modem for communicating with the mobile communication network 2404 and/or other radio-based modems (e.g., Bluetooth 2464 or Wi-Fi 2462). The wireless modem 2460 is typically configured for communication with one or more cellular networks, such as a GSM or CDMA network for data and voice communications within a single cellular network, between cellular networks, or between the mobile device and a public switched telephone network (PSTN).

The mobile device 2400 can further include at least one input/output port 2480, a power supply 2482, a satellite navigation system receiver 2484, such as a Global Positioning System (GPS) receiver, an accelerometer 2486, and/or a physical connector 2490, which can be a USB port, IEEE 1394 (FireWire) port, and/or RS-232 port. The illustrated components 2402 are not required or all-inclusive, as any components can be deleted and other components can be added.

Example 45—Exemplary Cloud-Supported Environment

Figure 25:
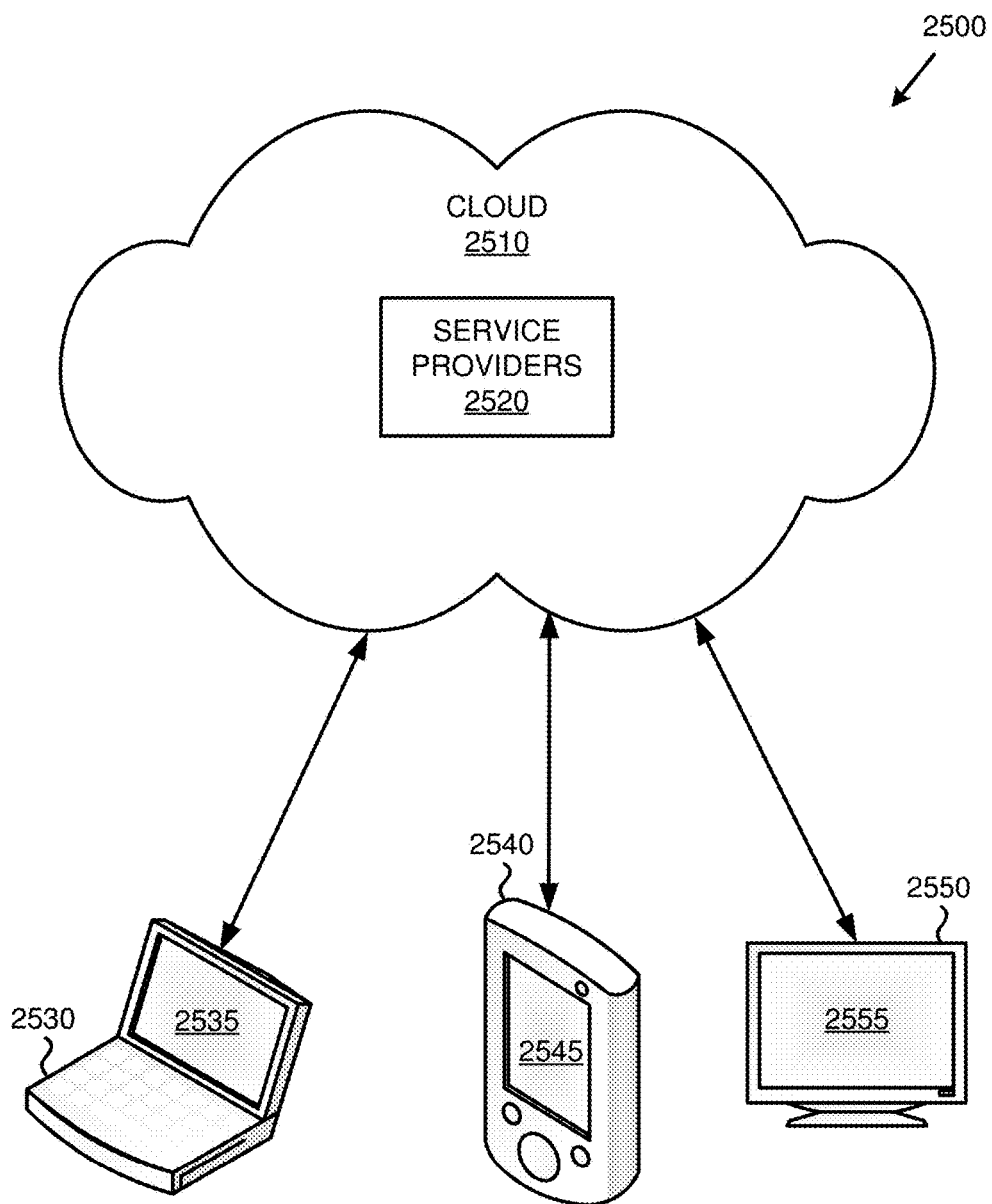
FIG. 25 is an exemplary cloud-support environment that can be used in conjunction with the technologies described herein.

In example environment 2500 of FIG. 25, the cloud 2510 provides services for connected devices 2530, 2540, 2550 with a variety of screen capabilities. Connected device 2530 represents a device with a computer screen 2535 (e.g., a mid-size screen). For example, connected device 2530 could be a personal computer such as desktop computer, laptop, notebook, netbook, or the like. Connected device 2540 represents a device with a mobile device screen 2545 (e.g., a small size screen). For example, connected device 2540 could be a mobile phone, smart phone, personal digital assistant, tablet computer, and the like. Connected device 2550 represents a device with a large screen 2555. For example, connected device 2550 could be a television screen (e.g., a smart television) or another device connected to a television (e.g., a set-top box or gaming console) or the like. One or more of the connected devices 2530, 2540, 2550 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2500. For example, the cloud 2510 can provide services for one or more computers (e.g., server computers) without displays.

Services can be provided by the cloud 2510 through service providers 2520, or through other providers of online services (not depicted). For example, cloud services can be customized to the screen size, display capability, and/or touch screen capability of a particular connected device (e.g., connected devices 2530, 2540, 2550).

In example environment 2500, the cloud 2510 provides the technologies and solutions described herein to the various connected devices 2530, 2540, 2550 using, at least in part, the service providers 2520. For example, the service providers 2520 can provide a centralized solution for various cloud-based services. The service providers 2520 can manage service subscriptions for users and/or devices (e.g., for the connected devices 2530, 2540, 2550 and/or their respective users).

Example 46—Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computing system to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Exemplary Combinations

Various combinations can be supported. For example, the incoming call user interface can be combined with the call-in-progress user interface (e.g., after the incoming call is accepted). The call-in-progress user interface can be combined with the background call-in-progress user interface (e.g., if the call moves to the background).

The call-in-progress user interface can be combined with the home user interface (e.g., if navigation occurs to the home user interface during a call). In such a case, the background call-in-progress user interface can also be displayed.

The user interface for initiating communications can be combined with any of the other user interfaces as well.

Alternatives

The technologies from any example can be combined with the technologies described in any one or more of the other examples. Where the word "exemplary" is used, it is intended to indicate an example and not an ideal embodiment. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a communication device, the method comprising:
   for a plurality of contacts stored at the communication device, reading contact information for the contacts, wherein the contact information comprises an email address;
   communicating the contact information to an address clearinghouse, wherein communicating the contact information to the address clearinghouse comprises sending the email address to the address clearinghouse;
   from the address clearinghouse, receiving participation confirmation and a user identifier of a video calling service for a participating contact out of the contacts having the email address;
   in a local address book, locally storing an indication that the participating contact is a participant in the video calling service;
   in the local address book, locally storing the user identifier of the video calling service; and
   subsequently, during an audio-only call with the participating contact having the email address, responsive to the stored indication that the participating contact is a participant in the video calling service, presenting an option to escalate the audio-only call on the communication device to a video call on the same communication device via the video calling service.

2. One or more computer-readable media comprising computer-executable instructions causing a computing system to perform the method of claim 1.

3. The method of claim 1 wherein:
   locally storing the indication comprises creating an entity record for the participating contact accessible by an application at the communication device that implements the video calling service.

4. The method of claim 3 further comprising:
   placing information sufficient to start a video call via the video calling service in the entity record.

5. The method of claim 4 wherein:
   the information sufficient to start a video call via the video calling service comprises a user identifier for the video calling service.

6. The method of claim 1 wherein:
   communicating the contact information to the address clearinghouse comprises sending the email address to the address clearinghouse for the participating contact.

7. The method of claim 6 further comprising:
   obfuscating the email address before communicating it to the address clearinghouse.

8. The method of claim 6 wherein:
   receiving participation confirmation comprises receiving a user identifier of the video calling service for the participating contact.

9. The method of claim 6 wherein:
   reading contact information for the contacts comprises crawling a local, global address book.

10. The method of claim 1 wherein:
    the method is performed before engaging in an audio-only call with the participating contact; and
    subsequently, an escalation option is presented during the audio-only call with the participating contact.

11. The method of claim 6 further comprising:
    determining that the communication device is idle; and
    responsive to determining that the communication device is idle, performing the method.

12. The method of claim 6 further comprising:
    responsive to receiving participation confirmation for a participating contact, bypassing a confirmation user interface.

13. The method of claim 12 further comprising:
    receiving a user indication that the confirmation user interface is to be bypassed for contacts having information stored at the communication device.

14. The method of claim 1 wherein:
    escalating the audio-only call comprises seamlessly escalating the audio-only call, wherein seamlessly escalating the audio-only call comprises ending the audio-only call without presenting an ended call message.

15. A system comprising:
    an endpoint device comprising a video calling application, a transition engine, and a plurality of stored contacts, wherein the endpoint device is in communication with an address book clearinghouse, wherein the address book clearinghouse stores a plurality of identifiers for users of a video calling service, wherein the endpoint device reads contact information for the plurality of stored contacts, and the contact information comprises an email address for a particular contact out of the plurality of stored contacts;
    wherein the endpoint device is configured to periodically communicate information about the particular contact out of the plurality of stored contacts to the address book clearinghouse and receive in response a confirmation that the particular contact is a participant in the video calling service and a user identifier of a video calling service for the particular contact out of the plurality of stored contacts, wherein the information about the particular contact comprises an email address;
    wherein the endpoint device is configured to locally store, in a local address book an indication that the particular contact out of the plurality of stored contacts is a participant in the video calling service; and
    wherein the endpoint device is configured to subsequently, during an audio-only call with the particular contact having the email address, bypass a confirmation user interface for the particular contact during call escalation of the audio-only call to a video call via the video calling service, responsive to the stored indication that the particular contact out of the plurality of stored contacts is a participant in the video calling service.

16. The system of claim 15 wherein:
the information about the particular contact comprises a contact identifier comprising the email address of the particular contact stored at the endpoint device.

17. The system of claim 16 wherein:
the address book clearinghouse is configured to confirm participation based on the email address.

18. The system of claim 16 wherein:
the address book clearinghouse is configured to provide a video service identifier for the video calling service responsive to receiving an email address.

19. The system of claim 15 wherein:
the endpoint device is configured to obfuscate the email address when communicating with the address book clearinghouse.

20. One or more non-volatile memories comprising computer-executable instructions causing a communications device to perform a method comprising:
determining that the communications device is idle;
responsive to determining that the communications device is idle, performing (a)-(d):
 (a) for a plurality of contacts stored at the communications device, reading contact information for the plurality of contacts, wherein the contact information comprises an email address;
 (b) communicating the contact information to an address clearinghouse, wherein communicating the contact information to the address clearinghouse comprises sending the email address to the address clearinghouse;
 (c) via the address clearinghouse, receiving participation confirmation and a user identifier of a video calling service for a participating contact out of the plurality of contacts having the email address;
 (d) in a local address book, locally storing an indication that the participating contact is a participant in a video calling service and locally storing the user identifier of the video calling service;
subsequently, during an audio-only call with the participating contact having the email address, responsive to the stored indication that the participating contact is a participant in the video calling service, presenting an option to add video to an audio-only call via the video calling service; and
bypassing a confirmation user interface for the participating contact.

\* \* \* \* \*